US012722328B2

(12) United States Patent
Oda et al.

(10) Patent No.: US 12,722,328 B2
(45) Date of Patent: Sep. 1, 2026

(54) SHEET MOLDING COMPOUND PRODUCTION METHOD, CARBON FIBER MAT DEPOSITION APPARATUS, AND SHEET MOLDING COMPOUND PRODUCTION APPARATUS

(71) Applicant: Mitsubishi Chemical Corporation, Tokyo (JP)

(72) Inventors: Kentaro Oda, Tokyo (JP); Yasushi Watanabe, Tokyo (JP); Tadao Samejima, Tokyo (JP); Yukihiro Mizutori, Tokyo (JP); Junji Kanehagi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 18/231,701

(22) Filed: Aug. 8, 2023

(65) Prior Publication Data

US 2023/0390967 A1 Dec. 7, 2023

Related U.S. Application Data

(63) Continuation of application No. PCT/JP2022/006032, filed on Feb. 16, 2022.

(30) Foreign Application Priority Data

Feb. 16, 2021 (JP) ................................ 2021-022590

(51) Int. Cl.

| | |
|---|---|
| ***B29B 11/16*** | (2006.01) |
| ***B29K 105/12*** | (2006.01) |
| ***D02J 1/18*** | (2006.01) |
| ***D04H 1/4242*** | (2012.01) |

(Continued)

(52) U.S. Cl.

CPC ................ *B29B 11/16* (2013.01); *D02J 1/18* (2013.01); *D04H 1/4242* (2013.01); *B29K 2101/10* (2013.01); *B29K 2105/128* (2013.01); *B29K 2307/04* (2013.01); *D10B 2505/02* (2013.01)

(58) Field of Classification Search

USPC ........... 118/308, 325, 300, 313, 315, 35–43; 427/258

See application file for complete search history.

(56) References Cited

U.S. PATENT DOCUMENTS

| | | |
|---|---|---|
| 3,081,499 A | 3/1963 | Goldman |
| 3,787,929 A | 1/1974 | Nam et al. |
| 6,019,105 A | 2/2000 | White |

(Continued)

FOREIGN PATENT DOCUMENTS

| | | |
|---|---|---|
| CN | 108367461 A | 8/2018 |
| CN | 109414886 A | 3/2019 |

(Continued)

OTHER PUBLICATIONS

International Search Report issued in related International Patent Application No. PCT/JP2022/006032 dated Apr. 5, 2022.

(Continued)

*Primary Examiner* — Yewebdar T Tadesse

(74) *Attorney, Agent, or Firm* — Morgan, Lewis & Bockius LLP

(57) ABSTRACT

The present disclosure provides a carbon fiber mat deposition apparatus and a method of manufacturing a sheet molding compound (SMC).

21 Claims, 22 Drawing Sheets

(51) Int. Cl.

| | |
|---|---|
| *B29K 101/10* | (2006.01) |
| *B29K 307/04* | (2006.01) |

(56) References Cited

U.S. PATENT DOCUMENTS

| | | | |
|---|---|---|---|
| 12,319,017 | B2 | 6/2025 | Nakao et al. |
| 2010/0028593 | A1 | 2/2010 | Taketa et al. |
| 2012/0213997 | A1 | 8/2012 | Wang et al. |
| 2015/0147543 | A1 | 5/2015 | Guha et al. |
| 2015/0197877 | A1 | 7/2015 | Zhao et al. |
| 2018/0162070 | A1 | 6/2018 | Iwata et al. |
| 2018/0209076 | A1 | 7/2018 | Samejima et al. |
| 2018/0250849 | A1 | 9/2018 | Samejima et al. |
| 2019/0153632 | A1 | 5/2019 | Motohashi et al. |
| 2019/0161890 | A1 | 5/2019 | Motohashi et al. |
| 2019/0177887 | A1 | 6/2019 | Motohashi et al. |
| 2020/0340146 | A1* | 10/2020 | Kawahara ................ D01G 9/04 |
| 2022/0049061 | A1 | 2/2022 | Ono et al. |
| 2022/0176647 | A1* | 6/2022 | Yamanaka .............. B29C 70/42 |
| 2022/0347890 | A1 | 11/2022 | Mizutori et al. |
| 2023/0020921 | A1 | 1/2023 | Watanabe et al. |
| 2023/0021189 | A1 | 1/2023 | Nakao et al. |
| 2023/0103035 | A1 | 3/2023 | Okamoto et al. |
| 2023/0390967 | A1 | 12/2023 | Oda et al. |

FOREIGN PATENT DOCUMENTS

| | | | |
|---|---|---|---|
| CN | 114981054 | A | 8/2022 |
| CN | 115298006 | A | 11/2022 |
| EP | 3395526 | A1 | 10/2018 |
| JP | S61-157335 | A | 7/1986 |
| JP | H04-135713 | A | 5/1992 |
| JP | H05-4246 | A | 1/1993 |
| JP | H05-42537 | A | 2/1993 |
| JP | H07-016836 | A | 1/1995 |
| JP | 2000-017557 | A | 1/2000 |
| JP | 2018-187862 | A | 4/2019 |
| JP | 2019-065405 | A | 4/2019 |
| JP | 2019-119148 | A | 7/2019 |
| JP | 2022-029523 | A | 2/2022 |
| WO | 2009/150406 | A2 | 12/2009 |
| WO | 2016/208731 | A1 | 12/2016 |
| WO | 2017/111056 | A1 | 6/2017 |
| WO | 2017/221655 | A1 | 12/2017 |
| WO | 2017/221688 | A1 | 12/2017 |
| WO | 2017/221658 | A1 | 4/2019 |
| WO | 2019/142851 | A1 | 7/2019 |
| WO | 2019/146486 | A1 | 8/2019 |
| WO | 2020/067058 | A1 | 4/2020 |
| WO | 2020/080238 | A1 | 4/2020 |
| WO | 2020/195756 | A1 | 10/2020 |
| WO | 2021/010084 | A1 | 1/2021 |
| WO | 2021/149578 | A1 | 7/2021 |
| WO | 2021/187346 | A1 | 9/2021 |
| WO | 2021/193234 | A1 | 9/2021 |
| WO | 2021/251205 | A1 | 12/2021 |

OTHER PUBLICATIONS

Extended European Search Report issued Jul. 3, 2024 for European Patent Application No. 22756184.2.

Extended European Search Report issued in corresponding European Patent Application No. 25154355.9, dated Apr. 2, 2025.

Office Action issued in corresponding Chinese Patent Application No. 202180023265.1, dated Mar. 8, 2025.

Office Action issued in corresponding Japanese Patent Application No. 2022-509977, dated Mar. 11, 2025.

Extended European Search Report issued in related European Patent Application No. 21776330.9 dated Jul. 28, 2023.

International Search Report issued in related International Patent Application No. PCT/JP2021/010601 dated May 18, 2021.

Office Action issued in related U.S. Appl. No. 17/946,395, dated Sep. 19, 2024.

Office Action issued in corresponding Chinese Patent Application No. 2022800137 45.4, dated Sep. 30, 2025.

Office Action issued in corresponding Chinese Patent Application No. 202180021170.6, dated Feb. 22, 2025.

Office Action issued in corresponding Japanese Patent Application No. 2022-508304, dated Mar. 11, 2025.

Extended European Search Report issued in related European Patent Application No. 21772392.3 dated Aug. 1, 2023.

Intemational Search Report issued in corresponding International Patent Application No. PCT/JP2021/009970 dated May 18, 2021.

Office Action issued in related U.S. Appl. No. 17/945,185, dated Aug. 11, 2025.

Office Action issued in related U.S. Appl. No. 17/945,185, dated Nov. 1, 2024.

Office Action issued in related U.S. Appl. No. 17/945,185, dated May 31, 2024.

Office Action issued in related U.S. Appl. No. 17/945,185, dated May 31, 2025.

Office Action issued in U.S. Appl. No. 17/945,185, dated Mar. 16, 2026.

* cited by examiner

10
S1
S2
S3
S4
G_S
L_S
L_G
A_S1
A_S2
A_S3
A_S4
x
y
z 100
10
20
30
41
42
51
51L
52
52L
60
110
120
130
131
132
133
140
141
142
150
160

(a)
T DIRECTION
132
10
20
141
152
41
150
(b)
T DIRECTION
132
10
20
141
152
41

140
141
141a
141b
142
142a
142b
150
150a
150a
150b
$d_{P1}$
$d_{P2}$
$d_{P3}$
41
VERTICAL PLANE INCLUDING ROTATION AXIS OF FIRST PIN ROLL 141
VERTICAL PLANE INCLUDING ROTATION AXIS OF SECOND PIN ROLL 142
TRAVEL DIRECTION OF FIRST CARRIER FILM 41

FIG. 11

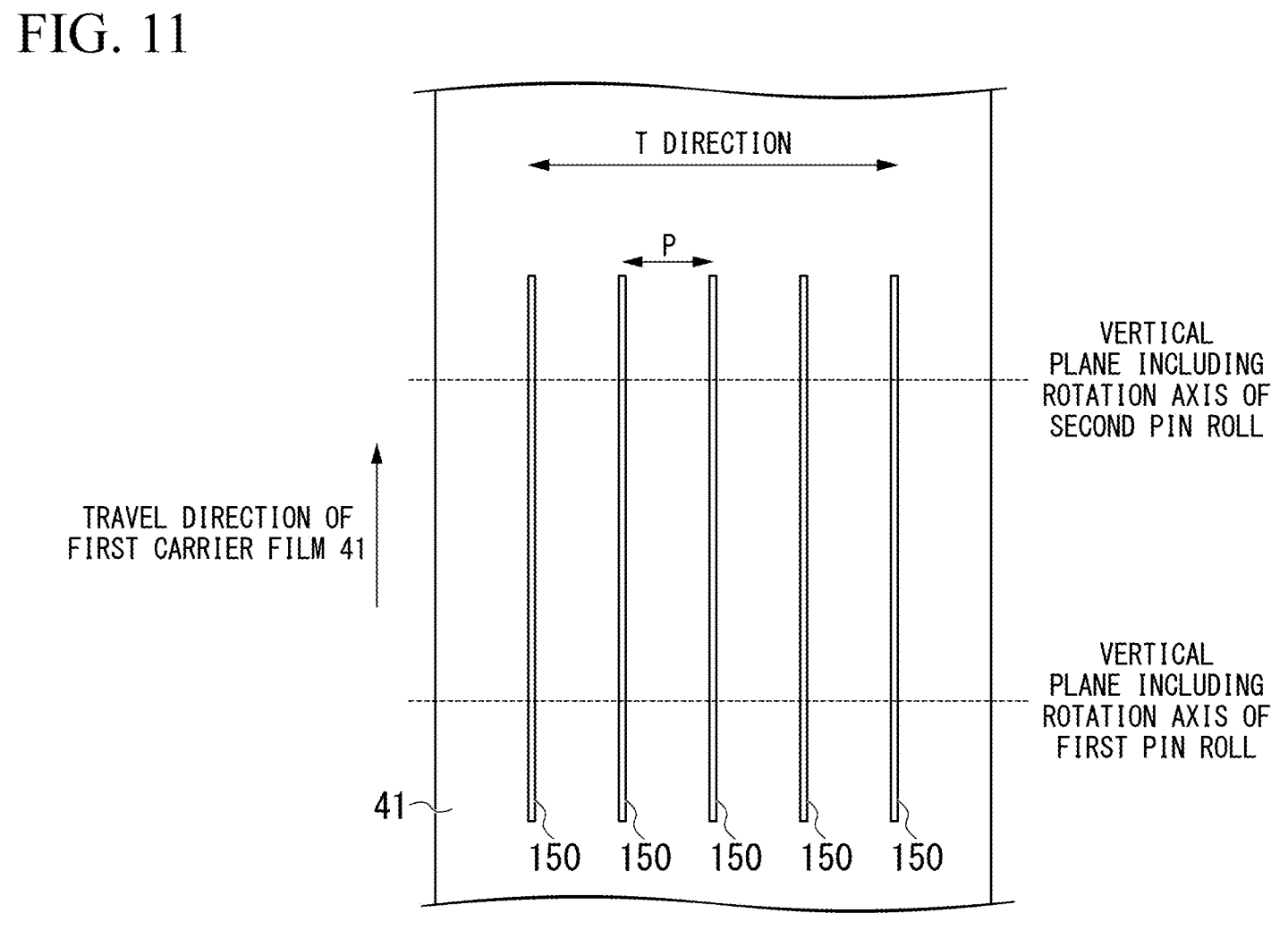

VERTICAL PLANE INCLUDING ROTATION AXIS OF SECOND PIN ROLL

VERTICAL PLANE INCLUDING ROTATION AXIS OF FIRST PIN ROLL

T DIRECTION

P

150

150

150

150

150

41

TRAVEL DIRECTION OF FIRST CARRIER FILM 41

FIG. 13

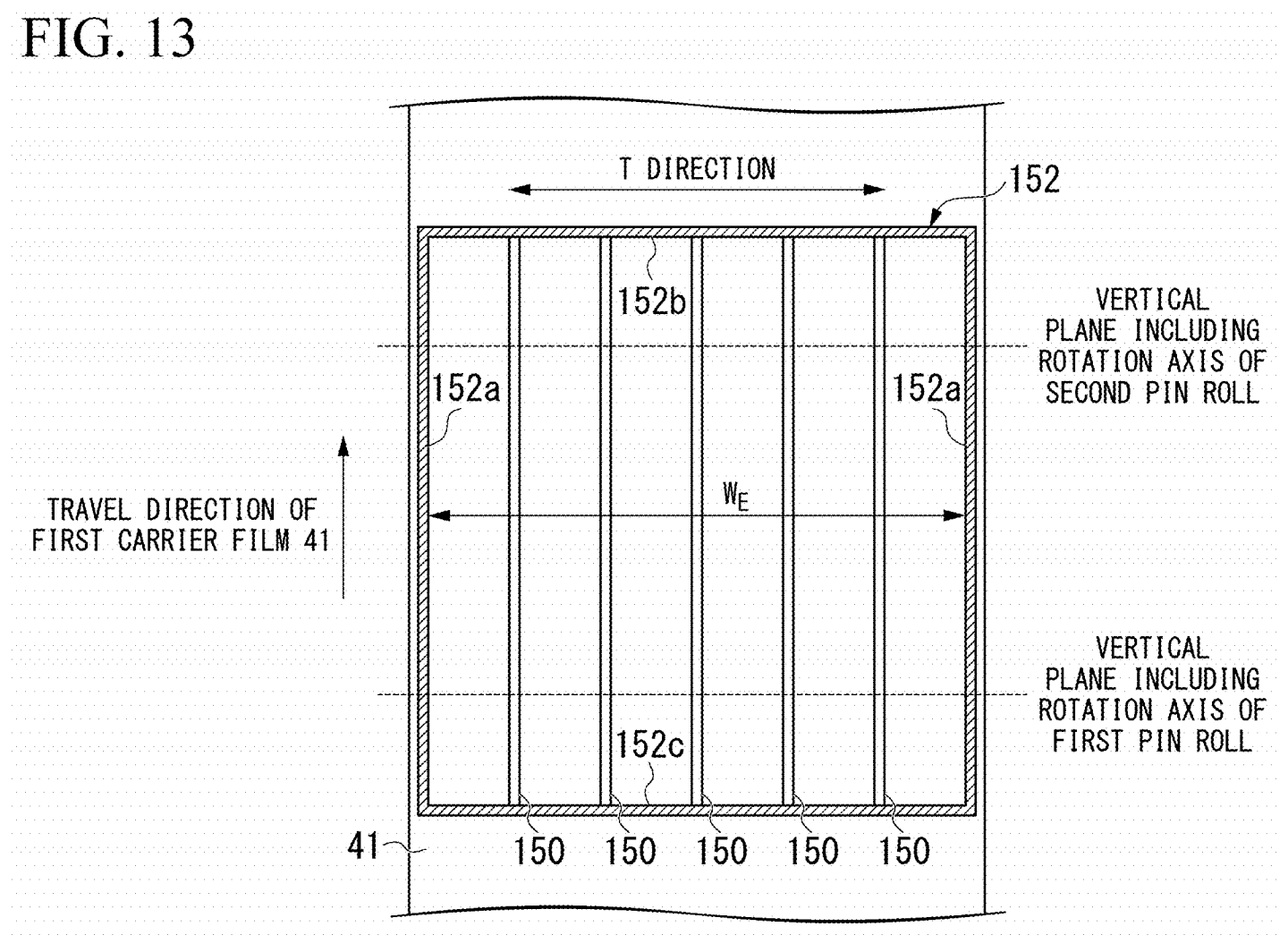

TRAVEL DIRECTION OF FIRST CARRIER FILM 41

VERTICAL PLANE INCLUDING ROTATION AXIS OF SECOND PIN ROLL

VERTICAL PLANE INCLUDING ROTATION AXIS OF FIRST PIN ROLL

T DIRECTION

152

152a

152b

152c

150

$W_E$

41

UNPROCESSED

FREQUENCY %

100
80
60
40
20
0

1 2 3 4 5 6 7 8 9 10 11 12 13 14 15

FILAMENT NUMBER K

CONTINUOUS CARBON FIBER BUNDLE

FIG. 21

T DIRECTION

PARTITION BOX

A

B

C

D

E

F

PARTITION

TRAVEL DIRECTION
OF CARRIER FILM

CARRIER FILM

VERTICAL PLANE INCLUDING ROTATION AXIS OF SECOND PIN ROLL
VERTICAL PLANE INCLUDING ROTATION AXIS OF FIRST PIN ROLL
$d_{12}$
T DIRECTION
$d_{12}\cdot\tan\theta$
150
150
150
150
150
41
θ
TRAVEL DIRECTION OF FIRST CARRIER FILM 41

SHEET MOLDING COMPOUND PRODUCTION METHOD, CARBON FIBER MAT DEPOSITION APPARATUS, AND SHEET MOLDING COMPOUND PRODUCTION APPARATUS

TECHNICAL FIELD

The present invention mainly relates to a method of manufacturing a sheet molding compound (SMC) and, in particular, to a method for manufacturing an SMC using carbon fibers (CF-SMC) as reinforcing fibers.

The present invention also relates to a carbon fiber mat deposition apparatus able to be suitably used for CF-SMC production and to an SMC manufacturing apparatus including the above.

This application is a continuation application of International Application No. PCT/JP2022/006032, filed on Feb. 16, 2022, which claims the benefit of priority of the prior Japanese Patent Application No. 2021-022590 filed Feb. 16, 2021 in Japan, the content of which is incorporated herein by reference.

BACKGROUND ART

Carbon fiber reinforced plastic (CFRP) is a lightweight material with excellent mechanical properties suitable for parts of automobiles, ships, railroad vehicles, manned aircraft, unmanned aircraft, and other transportation equipment, the importance of which has increased steadily in recent years.

In order to improve the production efficiency of CFRP products, an intermediate material in which a reinforcement comprising carbon fiber is impregnated in advance with a matrix resin, that is, a carbon fiber prepreg, has been developed.

A CF-SMC is a type of carbon fiber prepreg and, in the production steps thereof, a carbon fiber mat is formed from chopped carbon fiber bundles, which are produced by supplying a continuous carbon fiber bundle to a chopper and cutting it.

Techniques for depositing the carbon fiber mat with a uniform areal fiber weight on a traveling carrier film have been investigated (Patent Document 1 and Patent Document 2).

CITATION LIST

Patent Documents

Patent Document 1

PCT International Publication No. WO 2019/142851

Patent Document 2

PCT International Publication No. WO 2021/010084

SUMMARY OF INVENTION

Technical Problem

The main objective of the present invention is to provide a technique useful in manufacturing a CF-SMC having improved areal fiber weight uniformity.

In the present specification, problems that are solvable by each embodiment of the present invention may be explicitly or implicitly disclosed.

Solution to Problem

Preferable embodiments of the present invention include the following, without being limited thereto.

[1] A method of manufacturing a sheet molding compound comprising (i) drawing out a carrier film from a roll and causing the carrier film to travel such that a width direction of the carrier film is maintained to be horizontal, (ii) when a direction being horizontal and being perpendicular to a travel direction of the carrier film is denoted as a T direction, supplying a plurality of continuous carbon fiber bundles arranged in parallel to each other to a chopper comprising a cutter roll having a rotation axis parallel to the T direction, and cutting each of the continuous carbon fiber bundles to a predetermined length in a range of 5 mm to 60 mm using the chopper, (iii) depositing a carbon fiber mat by allowing chopped carbon fiber bundles produced by the cutting to fall onto the carrier film, after fragmentation-processing them using a fragmentation-processing apparatus A which is arranged below the chopper, (iv) impregnating the carbon fiber mat with a thermosetting resin composition, and (v) arranging a lower partition perpendicular to the T direction below the fragmentation-processing apparatus, wherein the fragmentation-processing apparatus A has a first pin roll and a second pin roll, which are arranged side by side in a direction perpendicular to the T direction and have each a rotation axis parallel to the T direction, the first pin roll is driven to rotate such that pins move downward from above on a side facing the second pin roll, and the second pin roll is driven to rotate such that pins move downward from above on a side facing the first pin roll.

[2] The method of manufacturing according to [1], wherein a sum of a maximum radius of the first pin roll and a maximum radius of the second pin roll is greater than a distance between the rotation axes of the first pin roll and the second pin roll.

[3] The method of manufacturing according to [1] or [2], wherein in each of the first pin roll and second pin roll, a radius of a cylinder is half or more of the maximum radius.

[4] The method of manufacturing according to any one of [1] to [3], wherein a circumferential speed at pin tips of the first pin roll is equal to a circumferential speed at pin tips of the second pin roll.

[5] The method of manufacturing according to any one of [1] to [4], wherein the carbon fiber mat contains carbon fiber bundles whose filament number exceeds 0.5 K with a content of 99% by weight or more.

[6] The method of manufacturing according to any one of [1] to [5], wherein each of the plurality of continuous carbon fiber bundles comprises N filaments and is partially split in advance into n sub-bundles, and the number of chopped carbon fiber bundles having a filament number of greater than $\{(N/n)+0.5\}$K included in a unit weight of the carbon fiber mat is reduced by the fragmentation-processing of the chopped carbon fiber bundles with the fragmentation-processing apparatus.

[7] The method of manufacturing according to any one of [1] to [6], wherein the lower partition intersects both a vertical plane including the rotation axis of the first pin roll and a vertical plane including the rotation axis of the second pin roll.

[8] The method of manufacturing according to any one of [1] to [7], wherein, at any location on an upper edge of the lower partition, a distance from a circumferential surface of a cylinder of the first pin roll is greater than a length of the pins of the first pin roll, and a distance from a circumferential surface of a cylinder of the second pin roll is greater than a length of the pins of the second pin roll.

[9] The method of manufacturing according to [8], wherein, at least between the vertical plane including the rotation axis of the first pin roll and the vertical plane including the rotation axis of the second pin roll, at least one of the following first condition and second condition is satisfied at any location on the upper edge of the lower partition, First condition: a distance from the circumferential surface of the cylinder of the first pin roll is less than the length of the pins of the first pin roll plus 3 cm, Second condition: a distance from the circumferential surface of the cylinder of the second pin roll is less than the length of the pins of the second pin roll plus 3 cm.

[10] The method of manufacturing according to any one of [1] to [9], wherein, at least between the vertical plane including the rotation axis of the first pin roll and the vertical plane including the rotation axis of the second pin roll, a distance to the carrier film is 20 cm or less at any location on a lower edge of the lower partition.

[11] The method of manufacturing according to any one of [1] to [10], wherein the lower partition is at least partially corrugated such that a horizontal cross-section has a wave shape.

[12] The method of manufacturing according to any one of [1] to [11], wherein a plurality of the lower partitions are lined up along the T direction.

[13] The method of manufacturing according to [12], wherein the plurality of the lower partitions are lined up along the T direction at a pitch having a length of twice or more of a fiber length of the chopped carbon fiber bundle.

[14] The method of manufacturing according to [1] or [13], wherein the plurality of the lower partitions are lined up at a pitch of 20 cm or less along the T direction.

[15] The method of manufacturing according to any one of [1] to [14], wherein all of the lower partitions are arranged inside an enclosure and the enclosure comprises two side walls which are each parallel to the travel direction of the carrier film, and a front wall and a rear wall which are each parallel to the T direction.

[16] The method of manufacturing according to [15], wherein at least a part of the enclosure is corrugated such that a horizontal cross-section has a wave shape.

[17] The method of manufacturing according to any one of [1] to [14], wherein all of the lower partitions are arranged between two side covers, the two side covers are each parallel to the travel direction of the carrier film, and a width of the carbon fiber mat in the T direction is regulated by the two side covers.

[18] The method of manufacturing according to any one of [1] to [17], further comprising arranging an upper partition perpendicular to the T direction between the chopper and the fragmentation-processing apparatus.

[19] The method of manufacturing according to [18], wherein the upper partition intersects both the vertical plane including the rotation axis of the first pin roll and the vertical plane including the rotation axis of the second pin roll.

[20] The method of manufacturing according to [18] or [19], wherein, at any location on a lower edge of the upper partition, a distance from the circumferential surface of a cylinder of the first pin roll is greater than the length of the pins of the first pin roll, and a distance from the circumferential surface of a cylinder of the second pin roll is greater than the length of the pins of the second pin roll.

[21] The method of manufacturing according to [20], wherein, at least between the vertical plane including the rotation axis of the first pin roll and the vertical plane including the rotation axis of the second pin roll, at least one of the following third condition and fourth condition is satisfied at any location on the lower edge of the upper partition, Third condition: a distance from the circumferential surface of the cylinder of the first pin roll is less than the length of the pins of the first pin roll plus 3 cm, Fourth condition: a distance from the circumferential surface of the cylinder of the second pin roll is less than the length of the pins of the second pin roll plus 3 cm.

[22] The method of manufacturing according to any one of [18] to [21], wherein, at least between the vertical plane including the rotation axis of the first pin roll and the vertical plane including the rotation axis of the second pin roll, at least one of the following fifth condition and sixth condition is satisfied at any location on an upper edge of the upper partition, Fifth condition: a distance from a circumferential surface of the cutter roll does not exceed 3 cm, Sixth condition: a distance from a circumferential surface of a receiving roll of the chopper does not exceed 3 cm.

[23] The method of manufacturing according to any one of [18] to [22], wherein a position of the upper partition in the T direction is identical to one of the lower partitions.

[24] The method of manufacturing according to any one of [18] to [23], wherein a plurality of the upper partitions are lined up along the T direction.

[25] The method of manufacturing according to any one of [1] to [24], wherein, before depositing the carbon fiber mat on the carrier film, a resin paste comprising a thermosetting resin composition is applied to an upper surface of the carrier film and, after depositing the carbon fiber mat, another carrier film in which another resin paste comprising a thermosetting resin composition is applied to one surface is overlapped on an upper surface side of the carrier film to form a laminate, and, further, the laminate is subjected to pressing.

[26] A carbon fiber mat deposition apparatus comprising a carrier film travel path, a chopper arranged above the travel path, a fragmentation-processing apparatus A arranged between the chopper and the travel path, and a lower partition arranged between the fragmentation-processing apparatus and the travel path, wherein, when a direction being horizontal and being perpendicular to the travel path is denoted as a T direction, the chopper comprises a cutter roll having a rotation axis parallel to the T direction, the lower partition is perpendicular to the T direction, the fragmentation-processing apparatus A has a first pin roll and a second pin roll, which are arranged side by side in a direction perpendicular to the T direction and have each a rotation axis parallel to the T direction, the first pin roll is driven to rotate such that pins move downward from above on a side facing the second pin roll, and the second pin roll is driven to rotate such that pins move downward from above on a side facing the first pin roll.

[27] The carbon fiber mat deposition apparatus according to [26], wherein a sum of a maximum radius of the first pin roll and a maximum radius of the second pin roll is greater than a distance between the rotation axes of the first pin roll and the second pin roll.

[28] The carbon fiber mat deposition apparatus according to [26] or [27], wherein, in each of the first pin roll and second pin roll, a radius of a cylinder is half or more of the maximum radius.

[29] The carbon fiber mat deposition apparatus according to any one of [26] to [28], wherein the lower partition intersects both a vertical plane including the rotation axis of the first pin roll and a vertical plane including the rotation axis of the second pin roll.

[30] The carbon fiber mat deposition apparatus according to any one of [26] to [29], wherein, at any location on an upper edge of the lower partition, a distance from a circumferential surface of the cylinder of the first pin roll is greater than a length of the pins of the first pin roll, and a distance from a circumferential surface of the cylinder of the second pin roll is greater than a length of the pins of the second pin roll.

[31] The carbon fiber mat deposition apparatus according to [30], wherein, at least between the vertical plane including the rotation axis of the first pin roll and the vertical plane including the rotation axis of the second pin roll, at least one of the following first condition and second condition is satisfied at any location on the upper edge of the lower partition, First condition: a distance from the circumferential surface of the cylinder of the first pin roll is less than a length of the pins of the first pin roll plus 3 cm, Second condition: a distance from the circumferential surface of the cylinder of the second pin roll is less than the length of the pins of the second pin roll plus 3 cm.

[32] The carbon fiber mat deposition apparatus according to any one of [26] to [31], wherein the lower partition is at least partially corrugated such that a horizontal cross-section has a wave shape.

[33] The carbon fiber mat deposition apparatus according to any one of [26] to [32], wherein a plurality of the lower partitions are lined up along the T direction.

[34] The carbon fiber mat deposition apparatus according to [33], wherein the plurality of the lower partitions are lined up at a pitch of 20 cm or less along the T direction.

[35] The carbon fiber mat deposition apparatus according to any one of [26] to [34], wherein all of the lower partitions are arranged inside an enclosure and the enclosure comprises two side walls which are each parallel to the travel path, and a front wall and a rear wall which are each parallel to the T direction.

[36] The carbon fiber mat deposition apparatus according to [35], wherein at least a part of the enclosure is corrugated such that a horizontal cross-section has a wave shape.

[37] The carbon fiber mat deposition apparatus according to any one of [26] to [36], wherein all of the lower partitions are arranged between two side covers, and the two side covers are each parallel to a travel direction of the carrier film and intersect both the vertical plane including the rotation axis of the first pin roll and the vertical plane including the rotation axis of the second pin roll.

[38] The carbon fiber mat deposition apparatus according to any one of [26] to [37], wherein an upper partition perpendicular to the T direction is arranged between the chopper and the fragmentation-processing apparatus.

[39] The carbon fiber mat deposition apparatus according to [38], wherein the upper partition intersects both the vertical plane including the rotation axis of the first pin roll and the vertical plane including the rotation axis of the second pin roll.

[40] The carbon fiber mat deposition apparatus according to [38] or [39], wherein at any location on a lower edge of the upper partition, a distance from the circumferential surface of the cylinder of the first pin roll is greater than the length of the pins of the first pin roll, and a distance from the circumferential surface of the cylinder of the second pin roll is greater than the length of the pins of the second pin roll.

[41] The carbon fiber mat deposition apparatus according to [40], wherein, at least between the vertical plane including the rotation axis of the first pin roll and the vertical plane including the rotation axis of the second pin roll, at least one of the following third condition and fourth condition is satisfied at any location on the lower edge of the upper partition, Third condition: a distance from the circumferential surface of the cylinder of the first pin roll is less than the length of the pins of the first pin roll plus 3 cm, Fourth condition: a distance from the circumferential surface of the cylinder of the second pin roll is less than the length of the pins of the second pin roll plus 3 cm.

[42] The carbon fiber mat deposition apparatus according to any one of [38] to [41], wherein a position of the upper partition in the T direction is identical to one of the lower partitions.

[43] The carbon fiber mat deposition apparatus according to any one of [38] to [42], wherein a plurality of the upper partitions are lined up along the T direction.

[44] A sheet molding compound manufacturing apparatus comprising the carbon fiber mat deposition apparatus according to any one of [26] to [43].

[45] The sheet molding compound manufacturing apparatus according to [44], further comprising two applicators, a mechanism for laminating two carrier films, and an impregnating machine.

[46] A method of manufacturing a sheet molding compound comprising (i) drawing out a carrier film from a roll and causing the carrier film to travel such that a width direction of the carrier film is maintained to be horizontal, (ii) when a direction being horizontal and being perpendicular to a travel direction of the carrier film is denoted as a T direction, supplying a plurality of continuous carbon fiber bundles arranged in parallel to each other to a chopper comprising a cutter roll having a rotation axis parallel to the T direction, and cutting each of the continuous carbon fiber bundles using the chopper, (iii) depositing a carbon fiber mat by allowing chopped carbon fiber bundles produced by the cutting fall onto the carrier film, after fragmentation-processing them using a fragmentation-processing apparatus which is arranged below the chopper, (iv) impregnating the carbon fiber mat with a thermosetting resin composition, and (v) arranging a partition partitioning a space along the T direction, the space being that through which the fragmentation-processed chopped carbon fiber bundles fall, wherein the partition is at least partially corrugated such that a horizontal cross-section has a wave shape.

[47] The method of manufacturing according to [46], wherein a waveform of the corrugation is a rectangular wave, a sine wave, a triangular wave, or a trapezoidal wave.

[48] The method of manufacturing according to [46] or [47], wherein the fragmentation-processing apparatus comprises a pin roll or cage roll, and the pin roll or the cage roll has a rotation axis parallel to the T direction.

[49] The method of manufacturing according to [46] or [47], wherein the fragmentation-processing apparatus has a first pin roll and a second pin roll, each of which is lined up in a direction perpendicular to the T direction and has a rotation axis parallel to the T direction, and the partition has a part sandwiched between a vertical plane including the rotation axis of the first pin roll and a vertical plane including the rotation axis of the second pin roll.

[50] The method of manufacturing according to [46] or [47], wherein the fragmentation-processing apparatus comprises only one pin roll having a rotation axis parallel to the T direction, the partition has a part sandwiched between a first vertical plane and a second vertical plane, and the first vertical plane and the second vertical plane are defined such that a vertical plane including the rotation axis of the pin roll is positioned intermediately between the first vertical plane and the second vertical plane, and a distance from the vertical plane including the rotation axis of the pin roll to the first vertical plane and a distance to the second vertical plane are both twice a maximum radius of the pin roll.

[51] The method of manufacturing according to [46] or [47], wherein the fragmentation-processing apparatus comprises a cage roll having a rotation axis parallel to the T direction, the partition has a part sandwiched between a third vertical plane and a fourth vertical plane, and the third vertical plane and the fourth vertical plane are defined such that a vertical plane including the rotation axis of the cage roll is positioned intermediately between the third vertical plane and the fourth vertical plane, and distances from the vertical plane including the rotation axis of the cage roll to the third vertical plane and to the fourth vertical plane are both twice a maximum radius of the cage roll.

[52] The method of manufacturing according to any one of [46] to [51], wherein a period of corrugation is twice or more a fiber length of the chopped carbon fiber bundle.

[53] A method of manufacturing a sheet molding compound comprising (i) drawing out a carrier film from a roll and causing the carrier film to travel such that a width direction of the carrier film is maintained to be horizontal, (ii) when a direction being horizontal and being perpendicular to a travel direction of the carrier film is denoted as a T direction, supplying a plurality of continuous carbon fiber bundles arranged in parallel to each other to a chopper comprising a cutter roll having a rotation axis parallel to the T direction, and cutting each of the continuous carbon fiber bundles using the chopper, (iii) depositing a carbon fiber mat by allowing chopped carbon fiber bundles produced by the cutting to fall onto the carrier film, after fragmentation-processing them using a fragmentation-processing apparatus which is arranged below the chopper, (iv) impregnating the carbon fiber mat with a thermosetting resin composition, and (v) arranging a partition partitioning a space along the T direction, the space being that through which the fragmentation-processed chopped carbon fiber bundles fall, wherein, in at least a part of the partition, a normal line is inclined from the T direction in a horizontal plane.

[54] The method of manufacturing according to [53], wherein an angle of the inclination is 1° or more, 5° or more, 10° or more, 15° or more, or 20° or more.

[55] The method of manufacturing according to [53] or [54], wherein the angle of the inclination is 45° or less, 40° or less, or 35° or less.

[56] The method of manufacturing according to any one of [53] to [55], wherein the fragmentation-processing apparatus comprises a pin roll or a cage roll, and the pin roll or the cage roll has a rotation axis parallel to the T direction.

[57] The method of manufacturing according to any one of [53] to [55], wherein the fragmentation-processing apparatus has a first pin roll and a second pin roll, which are arranged side by side in a direction perpendicular to the T direction and have each a rotation axis parallel to the T direction, and the partition has a part sandwiched between a vertical plane including the rotation axis of the first pin roll and a vertical plane including the rotation axis of the second pin roll.

[58] The method of manufacturing according to [57], wherein Expression (1) is satisfied, $$d_{12} \cdot \tan\theta \geq a \cdot L_F \quad (1)$$

where, in Expression (1), $d_{12}$ is a distance between the rotation axes of the first pin roll and the second pin roll, $L_F$ is a fiber length of the chopped carbon fiber bundle, and a is preferably 1 and more preferably 2.

[59] The method of manufacturing according to any one of [53] to [55], wherein the fragmentation-processing apparatus comprises only one pin roll having a rotation axis parallel to the T direction, the partition has a part sandwiched between a first vertical plane and a second vertical plane, and the first vertical plane and the second vertical plane are defined such that a vertical plane including the rotation axis of the pin roll is positioned intermediately between the first vertical plane and the second vertical plane, and distances from the vertical plane including the rotation axis of the pin roll to the first vertical plane and to the second vertical plane are both twice a maximum radius of the pin roll.

[60] The method of manufacturing according to [59], wherein Expression (2) is satisfied, $$D_{34} \cdot \tan\theta \geq a \cdot L_F \quad (2)$$

where, in Expression (2), $D_{12}$ is a distance between the first vertical plane and the second vertical plane, $L_F$ is the fiber length of the chopped carbon fiber bundle, and a is preferably 1 and more preferably 2.

[61] The method of manufacturing according to any one of [53] to [55], wherein the fragmentation-processing apparatus comprises a cage roll having a rotation axis parallel to the T direction, the partition has a part sandwiched between a third vertical plane and a fourth vertical plane, and the third vertical plane and the fourth vertical plane are defined such that a vertical plane including the rotation axis of the cage roll is positioned intermediately between the third vertical plane and the fourth vertical plane, and distances from the vertical plane including the rotation axis of the cage roll to the third vertical plane and to the fourth vertical plane are both twice a maximum radius of the cage roll.

[62] The method of manufacturing according to [61], wherein Expression (3) is satisfied, $$D_{34} \cdot \tan \theta \geq a \cdot L_F \quad (3)$$

where, in Expression (3), $D_{34}$ is a distance between the third vertical plane and the fourth vertical plane, $L_F$ is the fiber length of the chopped carbon fiber bundle, and a is preferably 1 and more preferably 2.

[63] The method of manufacturing according to any of to [62], wherein a plurality of the partitions are lined up along the T direction.

[64] The method of manufacturing according to any one of [46] to [63], wherein all of the partitions are arranged inside an enclosure, and the enclosure may comprise two side walls each parallel to the travel direction of the carrier film and a front wall and a rear wall each parallel to the T direction and may be at least partially corrugated such that a horizontal cross-section has a wave shape.

[65] The method of manufacturing according to any one of [46] to [63], wherein all of the partitions are arranged between two side covers, the two side covers are each parallel to the travel direction of the carrier film, and a width of the carbon fiber mat in the T direction is regulated by the two side covers.

[66] The method of manufacturing according to any one of [46] to [65], wherein the carbon fiber mat contains carbon fiber bundles whose filament number exceeds 0.5 K with a content of 99% by weight or more.

[67] The method of manufacturing according to any one of [46] to [66], wherein each of the plurality of continuous carbon fiber bundles comprises N filaments and is partially split in advance into n sub-bundles, and the number of chopped carbon fiber bundles whose filament number is greater than $\{(N/n)+0.5\}$K contained in a unit weight of the carbon fiber mat is reduced by the fragmentation-processing of the chopped fiber bundles with the fragmentation-processing apparatus.

[68] The method of manufacturing according to any one of [46] to [67], wherein, before depositing the carbon fiber mat on the carrier film, a resin paste comprising a thermosetting resin composition is applied to an upper surface of the carrier film, and after depositing the carbon fiber mat, another carrier film in which another resin paste comprising a thermosetting resin composition is applied to one surface is overlapped on an upper surface side of the carrier film to form a laminate, and, further, the laminate is subjected to pressing.

[69] A carbon fiber mat deposition apparatus comprising a carrier film travel path, a chopper arranged above the travel path, a fragmentation-processing apparatus arranged between the chopper and the travel path, and a partition by which a space between the fragmentation-processing apparatus and the travel path is partitioned along a T direction, wherein, when a direction being horizontal and being perpendicular to the travel path is the T direction, the chopper comprises a cutter roll having a rotation axis parallel to the T direction, and the partition is at least partially corrugated such that a horizontal cross-section has a wave shape.

[70] The carbon fiber mat deposition apparatus according to [69], wherein a waveform of the corrugation is a rectangular wave, a sine wave, a triangular wave, or a trapezoidal wave.

[71] The carbon fiber mat deposition apparatus according to [69] or [70], wherein the fragmentation-processing apparatus comprises a pin roll or a cage roll, and the pin roll or the cage roll has a rotation axis parallel to the T direction.

[72] The carbon fiber mat deposition apparatus according to [69] or [70], wherein the fragmentation-processing apparatus has a first pin roll and a second pin roll, which are arranged side by side in a direction perpendicular to the T direction and have each a rotation axis parallel to the T direction, and the partition has a part sandwiched between a vertical plane including the rotation axis of the first pin roll and a vertical plane including the rotation axis of the second pin roll.

[73] The carbon fiber mat deposition apparatus according to [69] or [70], wherein the fragmentation-processing apparatus comprises only one pin roll having a rotation axis parallel to the T direction, the partition has a part sandwiched between a first vertical plane and a second vertical plane, and the first vertical plane and the second vertical plane are defined such that a vertical plane including the rotation axis of the pin roll is positioned intermediately between the first vertical plane and the second vertical plane, and distances from the vertical plane including the rotation axis of the pin roll to the first vertical plane and to the second vertical plane are both twice a maximum radius of the pin roll.

[74] The carbon fiber mat deposition apparatus according to [69] or [70], wherein the fragmentation-processing apparatus comprises a cage roll having a rotation axis parallel to the T direction, the partition has a part sandwiched between a third vertical plane and a fourth vertical plane, and the third vertical plane and the fourth vertical plane are defined such that a vertical plane including the rotation axis of the cage roll is positioned intermediately between the third vertical plane and the fourth vertical plane, and distances from the vertical plane including the rotation axis of the cage roll to the third vertical plane and to the fourth vertical plane are both twice a maximum radius of the cage roll.

[75] The carbon fiber mat deposition apparatus according to any one of [69] to [74], wherein a period of corrugation is twice or more a fiber length of the chopped carbon fiber bundle produced when a continuous carbon fiber bundle is cut by the chopper.

[76] A carbon fiber mat deposition apparatus comprising a carrier film travel path, a chopper arranged above the travel path, a fragmentation-processing apparatus arranged between the chopper and the travel path, and a partition by which a space between the fragmentation-processing apparatus and the travel path is partitioned along a T direction, wherein, when a direction being horizontal and being perpendicular to the travel path is the T direction, the chopper comprises a cutter roll having a rotation axis parallel to the T direction, and, in at least a part of the partition, a normal line is inclined from the T direction in a horizontal plane.

[77] The carbon fiber mat deposition apparatus according to [76], wherein an angle of the inclination is 1° or more, 5° or more, 10° or more, 15° or more, or 20° or more.

[78] The carbon fiber mat deposition apparatus according to [76] or [77], wherein an angle of the inclination is 45° or less, 40° or less, or 35° or less.

[79] The carbon fiber mat deposition apparatus according to any one of [76] to [78], wherein the fragmentation-processing apparatus comprises a pin roll or a cage roll, and the pin roll or the cage roll has a rotation axis parallel to the T direction.

[80] The carbon fiber mat deposition apparatus according to any one of [76] to [78], wherein the fragmentation-processing apparatus has a first pin roll and a second pin roll, which are arranged side by side in a direction perpendicular to the T direction and have each a rotation axis parallel to the T direction, and the partition has a part sandwiched between a vertical plane including the rotation axis of the first pin roll and a vertical plane including the rotation axis of the second pin roll.

[81] The carbon fiber mat deposition apparatus according to [80], wherein Expression (1) is satisfied, $$d_{12} \cdot \tan\theta \geq a \cdot L_F \quad (1)$$

where, in Expression (1), $d_{12}$ is a distance between the rotation axes of the first pin roll and the second pin roll, $L_F$ is a fiber length of the chopped carbon fiber bundle produced when a continuous carbon fiber bundle is cut by the chopper, and a is preferably 1 and more preferably 2.

[82] The carbon fiber mat deposition apparatus according to any one of [76] to [78], wherein the fragmentation-processing apparatus comprises only one pin roll having a rotation axis parallel to the T direction, the partition has at least a part sandwiched between a first vertical plane and a second vertical plane, and the first vertical plane and the second vertical plane are defined such that a vertical plane including the rotation axis of the pin roll is positioned intermediately between the first vertical plane and the second vertical plane, and distances from the vertical plane including the rotation axis of the pin roll to the first vertical plane and to the second vertical plane are both twice a maximum radius of the pin roll.

[83] The carbon fiber mat deposition apparatus according to [82], wherein Expression (2) is satisfied, $$D_{12} \cdot \tan\theta \geq a \cdot L_F \quad (2)$$

where, in Expression (2), $D_{12}$ is a distance between the first vertical plane and the second vertical plane, $L_F$ is the fiber length of the chopped carbon fiber bundle produced when the continuous carbon fiber bundle is cut by the chopper, and a is preferably 1 and more preferably 2.

[84] The carbon fiber mat deposition apparatus according to any one of [76] to [78], wherein the fragmentation-processing apparatus comprises a cage roll having a rotation axis parallel to the T direction, the partition has at least a part sandwiched between a third vertical plane and a fourth vertical plane, and the third vertical plane and the fourth vertical plane are defined such that a vertical plane including the rotation axis of the cage roll is positioned intermediately between the third vertical plane and the fourth vertical plane, and distances from the vertical plane including the rotation axis of the cage roll to the third vertical plane and to the fourth vertical plane are both twice a maximum radius of the cage roll.

[85] The carbon fiber mat deposition apparatus according to [84], wherein Expression (3) is satisfied, $$D_{34} \cdot \tan\theta \geq a \cdot L_F \quad (3)$$

where, in Expression (3), $D_{34}$ is a distance between the third vertical plane and the fourth vertical plane, $L_F$ is the fiber length of the chopped carbon fiber bundle produced when the continuous carbon fiber bundle is cut by the chopper, and a is preferably 1 and more preferably 2.

[86] The carbon fiber mat deposition apparatus according to any one of [69] to [85], wherein a plurality of the partitions are lined up along the T direction.

[87] The carbon fiber mat deposition apparatus according to any one of [69] to [86], wherein all of the partitions are arranged inside an enclosure, and the enclosure may comprise two side walls each parallel to the travel path and a front wall and a rear wall each parallel to the T direction and may be at least partially corrugated such that a horizontal cross-section has a wave shape.

[88] The carbon fiber mat deposition apparatus according to any one of [69] to [86], wherein all of the partitions are arranged between two side covers.

[89] A sheet molding compound manufacturing apparatus comprising the carbon fiber mat deposition apparatus according to any one of [69] to [88].

[90] The sheet molding compound manufacturing apparatus according to [89], further comprising two applicators, a mechanism for laminating two carrier films, and an impregnating machine.

[91] A method of manufacturing a sheet molding compound that uses the sheet molding compound manufacturing apparatus according to [89] or [90].

Advantageous Effects of Invention

The present invention provides a technique useful for manufacturing a CF-SMC having improved areal fiber weight uniformity.

BRIEF DESCRIPTION OF DRAWINGS

FIG. 11 is a plan view showing a plurality of lower partitions perpendicular to the T direction being lined up along the T direction.

FIG. 13 shows an embodiment in which the lower partitions are arranged inside the enclosure.

FIG. 20 is a diagram illustrating the pitch between continuous carbon fiber bundles when arranged in parallel to be supplied to a chopper.

FIG. 21 is a plan view showing the arrangement of six compartments of a partition box and the directions when the partition box is placed on the carrier film.

FIGS. 24(*a*) to 24(*c*) show corrugated plates in which the horizontal cross-sections are sine waves, triangular waves, and trapezoidal waves, respectively.

DESCRIPTION OF EMBODIMENTS

1. Method of Manufacturing a Sheet Molding Compound (SMC)

One embodiment of the present invention relates to a method of manufacturing an SMC, including the following (i) to (v).

(i) Drawing out a carrier film from a roll and causing the carrier film to travel such that a width direction of the carrier film is maintained to be horizontal.

(ii) When a direction being horizontal and being perpendicular to the travel direction of the carrier film is denoted as a T direction, supplying a plurality of continuous carbon fiber bundles arranged in parallel to each other to a chopper comprising a cutter roll having a rotation axis parallel to the T direction, and cutting each of the continuous carbon fiber bundles using the chopper to a predetermined length in a range of 5 mm to 60 mm.

(iii) Depositing a carbon fiber mat by allowing chopped carbon fiber bundles produced by the cutting to fall onto the carrier film, after fragmentation-processing them using a fragmentation-processing apparatus A which is arranged below the chopper; the fragmentation-processing apparatus A has a first pin roll and a second pin roll, which are arranged side by side in a direction perpendicular to the T direction and have each a rotation axis parallel to the T direction, the first pin roll is driven to rotate such that pins move downward from above on a side facing the second pin roll, and the second pin roll is driven to rotate such that pins move downward from above on a side facing the first pin roll.

(iv) Impregnating the carbon fiber mat with a thermosetting resin composition.

(v) Arranging a lower partition perpendicular to the T direction below the fragmentation-processing apparatus.

A detailed description will be given below of the method of manufacturing an SMC according to the present embodiment using specific examples.

1.1. Continuous Carbon Fiber Bundle

The continuous carbon fiber bundle used in the method of manufacturing an SMC of the present embodiment preferably comprises PAN (polyacrylonitrile)-based carbon fiber filaments and the filament number per bundle is not limited, but is 3K to 100K, for example. Here, NK means N×1,000. Thus, 3K to 100K is, in other words, 3,000 to 100,000.

Figure 1:
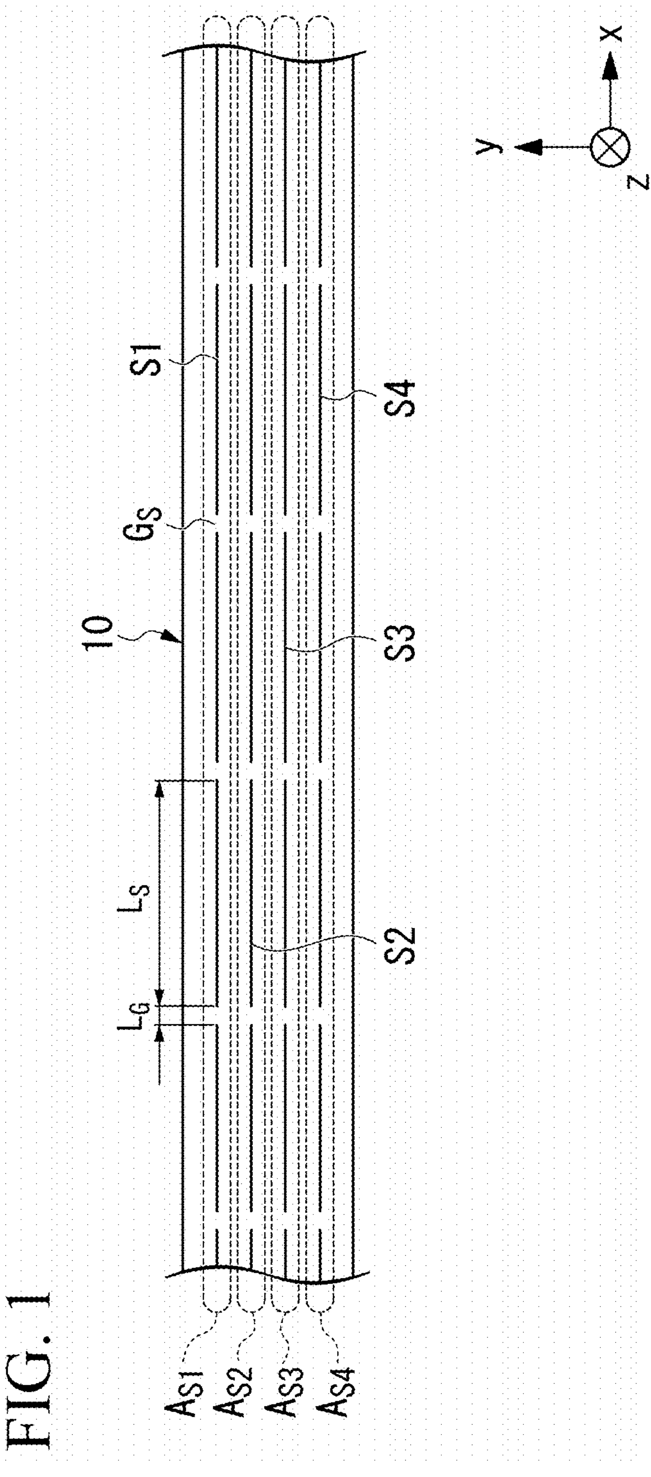
FIG. 1 is a plan view showing a continuous carbon fiber bundle partially split into five parts.
Figure 2:
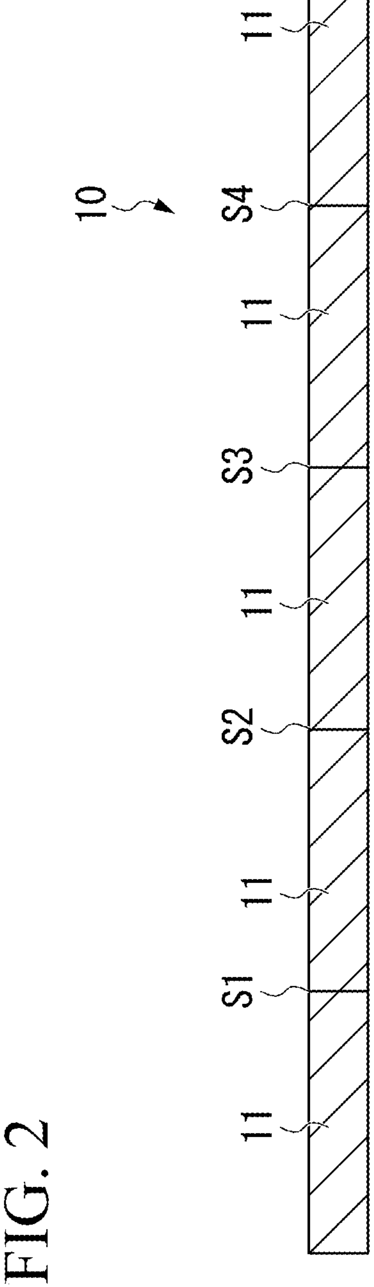
FIG. 2 is a cross-sectional view showing a continuous carbon fiber bundle partially split into five parts.
Figure 2:
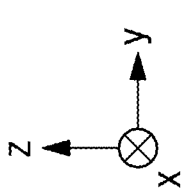

The continuous carbon fiber bundle is not limited, but may be partially split in advance into a plurality of sub-bundles, as shown by the examples in FIG. 1 and FIG. 2.

In FIG. 1 and FIG. 2, a continuous carbon fiber bundle 10 having a flat shape is partially split into five sub-bundles 11 by slitting. For convenience, the fiber direction (longitudinal direction) of the fiber bundle is the x direction, the width direction is the y direction, and the thickness direction is the z direction, FIG. 1 is a plan view in which the continuous carbon fiber bundle 10 is seen from the z direction, and FIG. 2 shows a cross-section of the continuous carbon fiber bundle 10 perpendicular to the x direction (the cross-section when cut in the y-z plane).

As shown in FIG. 1, four slit rows are formed in the continuous carbon fiber bundle 10 which are a first slit row $A_{S1}$, a second slit row $A_{S2}$, a third slit row $A_{S3}$, and a fourth slit row $A_{S4}$.

The first slit row $A_{S1}$ comprises a plurality of first slits S1 lined up in the x direction.

The second slit row $A_{S2}$ comprises a plurality of second slits S2 lined up in the x direction.

The third slit row $A_{S3}$ comprises a plurality of third slits S3 lined up in the x direction.

The fourth slit row $A_{S4}$ comprises a plurality of fourth slits S4 lined up in the x direction.

The slit length $L_S$ and the inter-slit gap length $L_G$ are constant within any of the slit rows and are also common between different slit rows.

The ratio $L_S/(L_S+L_G)$ of the slit length $L_S$ to the sum of the slit length $L_S$ and the inter-slit gap length $L_G$ is usually 90% or more, preferably 95% or more, and may be 99%, for example. Accordingly, the continuous carbon fiber bundle 10 is split into five sub-bundles 11 in most parts, as shown in FIG. 2.

The positions of the first slit row $A_{S1}$, second slit row $A_{S2}$, third slit row $A_{S3}$, and fourth slit row $A_{S3}$ in the y direction are set such that the widths of the five sub-bundles 11 are generally the same. For example, when the filament number of the continuous carbon fiber bundle 10 is 15K, the filament number of each sub-bundle 11 is 3K±0.5K.

The slit length $L_S$ is not limited, but longer than 100 mm is preferable and longer than 500 mm is more preferable.

It is possible for the slit length $L_S$ to be, for example, more than 25 mm to 50 mm or less, more than 50 mm to 100 mm or less, more than 100 mm to 200 mm or less, more than 200 mm to 500 mm or less, more than 500 mm to 1,000 mm or less, more than 1,000 mm to 1,500 mm or less, more than 1,500 mm to 2,000 mm or less, more than 2,000 mm to 3,000 mm or less, or the like.

The inter-slit gap length $L_G$ is not limited, but may be 1 mm to 10 mm, for example.

The positions of the inter-slit gaps $G_S$ in the x direction are preferably coincident between all slit rows as in the example shown in FIG. 1, but may not be.

The above is not limited to when the number of sub-bundles formed by partially splitting the continuous carbon fiber bundle 10 is five, but also applies when four or fewer or six or more.

The filament number in the sub-bundle formed by splitting the continuous carbon fiber bundle 10 is preferably 15K or less, more preferably 10K or less, even more preferably 5K or less and may be 4K or less, or 3K or less, without being related to the number of sub-bundles to be formed. The filament number in a sub-bundle is not limited, but is preferably greater than 0.5K.

1.2. Manufacturing Apparatus

Figure 3:
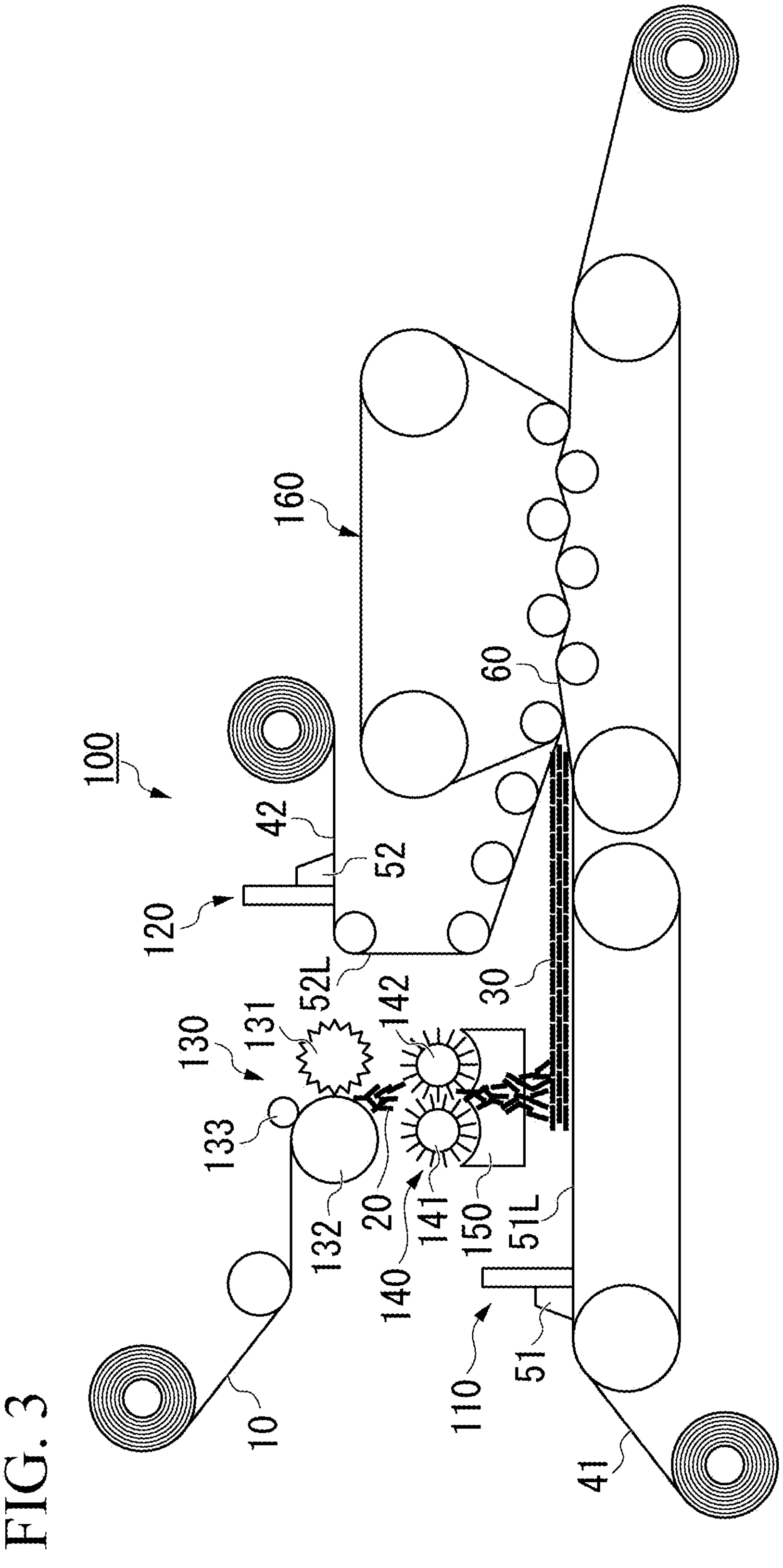
FIG. 3 is a schematic diagram of an SMC manufacturing apparatus.

A conceptual diagram of an SMC manufacturing apparatus able to be preferably used when producing an SMC using the method of manufacturing an SMC of the present embodiment is shown in FIG. 3.

Referring to FIG. 3, the SMC manufacturing apparatus 100 has a first applicator 110, a second applicator 120, a chopper 130, a fragmentation-processing apparatus 140, a lower partition 150, and an impregnating machine 160.

Both the first carrier film 41 and the second carrier film 42, which are drawn out from different rolls, are always maintained to be horizontal in the width direction.

The first applicator 110 is used to apply a first resin paste 51 to the first carrier film 41 to form a first resin paste layer 51L.

The second applicator 120 is used to apply a second resin paste 52 to the second carrier film 42 to form a second resin paste layer 52L.

Figure 4:
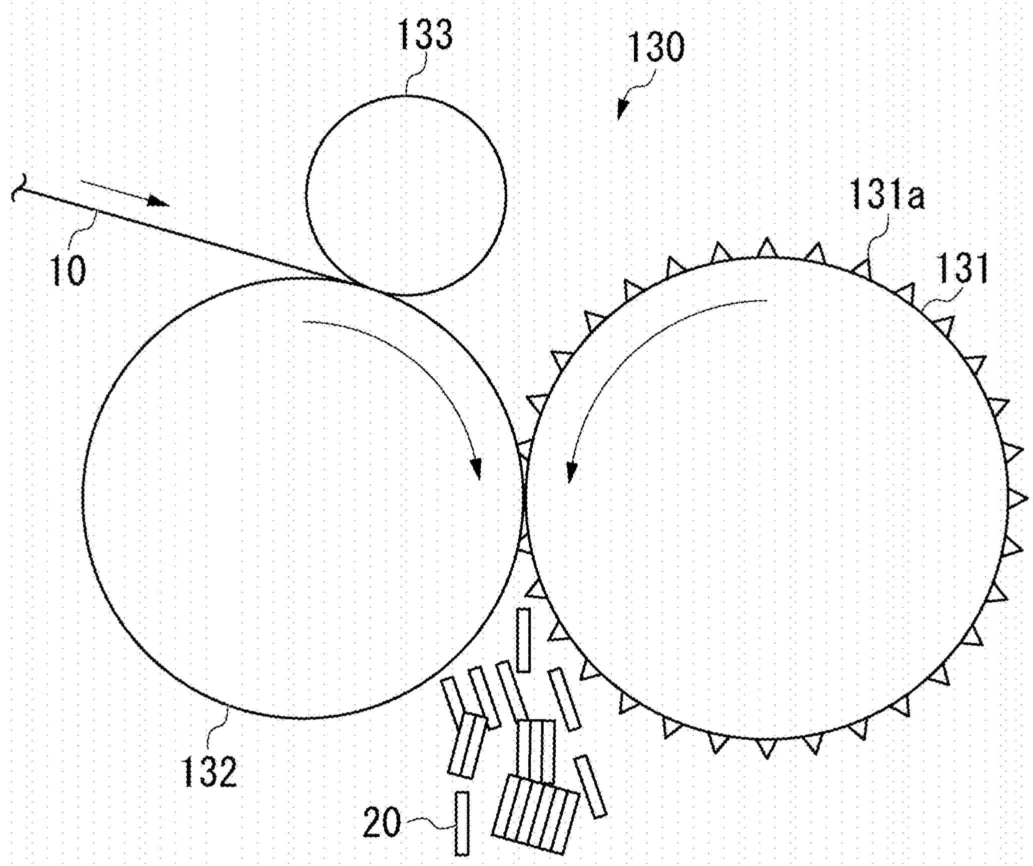
FIG. 4 is a schematic diagram of a chopper.

The chopper 130 comprises a cutter roll 131, a receiving roll (rubber roll) 132, and a guide roll 133, as shown in FIG. 4. On the outer circumference of the cutter roll 131, a plurality of cutting blades 131*a*, each extending in the direction of the rotation axis of the cutter roll 131, are arranged at regular intervals in the circumferential direction. The direction in which the cutting blades 131*a* extend may be inclined with respect to the direction of the rotation axis of the cutter roll 131.

The rotation axes of the cutter roll 131, the receiving roll 132, and the guide roll 133 are all parallel to the T direction.

The T direction is a direction being horizontal and being perpendicular to the travel direction of the first carrier film 41. In FIG. 3, the T direction is perpendicular to the paper surface. The width direction of the first carrier film 41 traveling below the chopper 130 is also parallel to the T direction.

When a plurality of continuous carbon fiber bundles 10 are arranged to be parallel to each other and supplied to the chopper 130 from a direction intersecting the rotation axis of the cutter roll 131, chopped carbon fiber bundles 20 having a constant fiber length are cut out one after another from each of the plurality of continuous carbon fiber bundles.

The fragmentation-processing apparatus 140 is provided with a pair of pin rolls both having rotation axes parallel to the T direction, that is, a first pin roll 141 and a second pin roll 142.

The first pin roll 141 and the second pin roll 142 are arranged side by side in a direction perpendicular to the T direction.

Figure 5:
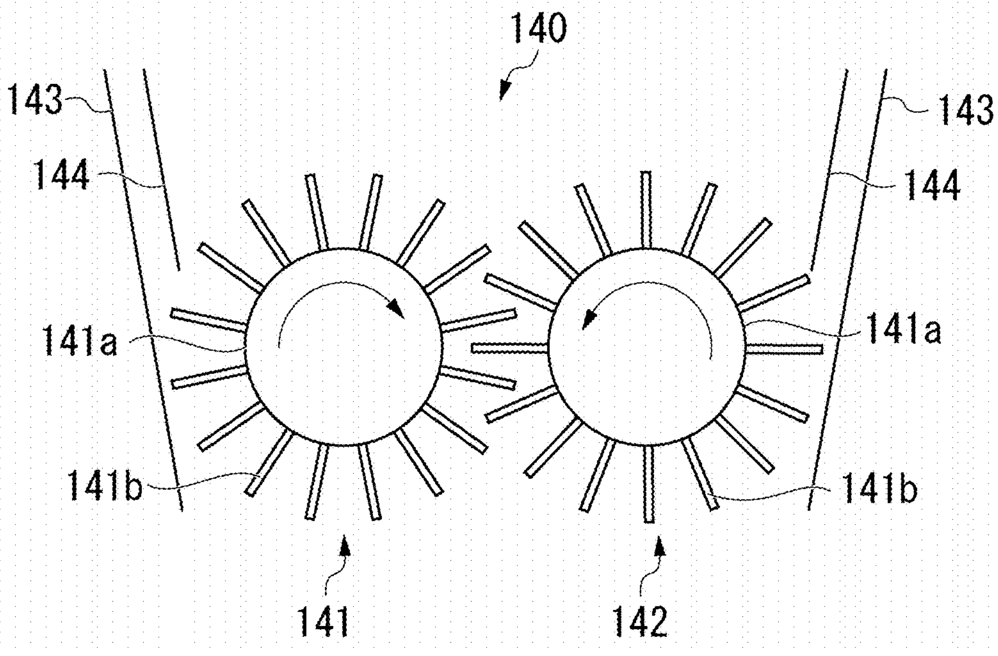
FIG. 5 is a schematic diagram of a fragmentation-processing apparatus.

In the example shown in FIG. 5, the fragmentation-processing apparatus 140 is provided with covers 143 and a guide plate 144 arranged in the inside thereof, but may not be.

The objective of the fragmentation-processing performed by the fragmentation-processing apparatus 140 is to split one chopped carbon fiber bundle 20 into two or more fiber bundles by striking with a pin roll, thereby increasing the ratio of chopped carbon fiber bundles comprising a smaller number of fiber filaments, which are included in the carbon fiber mat 30 deposited on the first carrier film 41. In the fragmentation-processing, it is not necessary for all of the chopped carbon fiber bundles produced by the cutting of the continuous carbon fiber bundles to be split into two or more fiber bundles each. Some of the chopped carbon fiber bundles may pass through the fragmentation-processing apparatus without being split into two or more fiber bundles.

Figure 6:
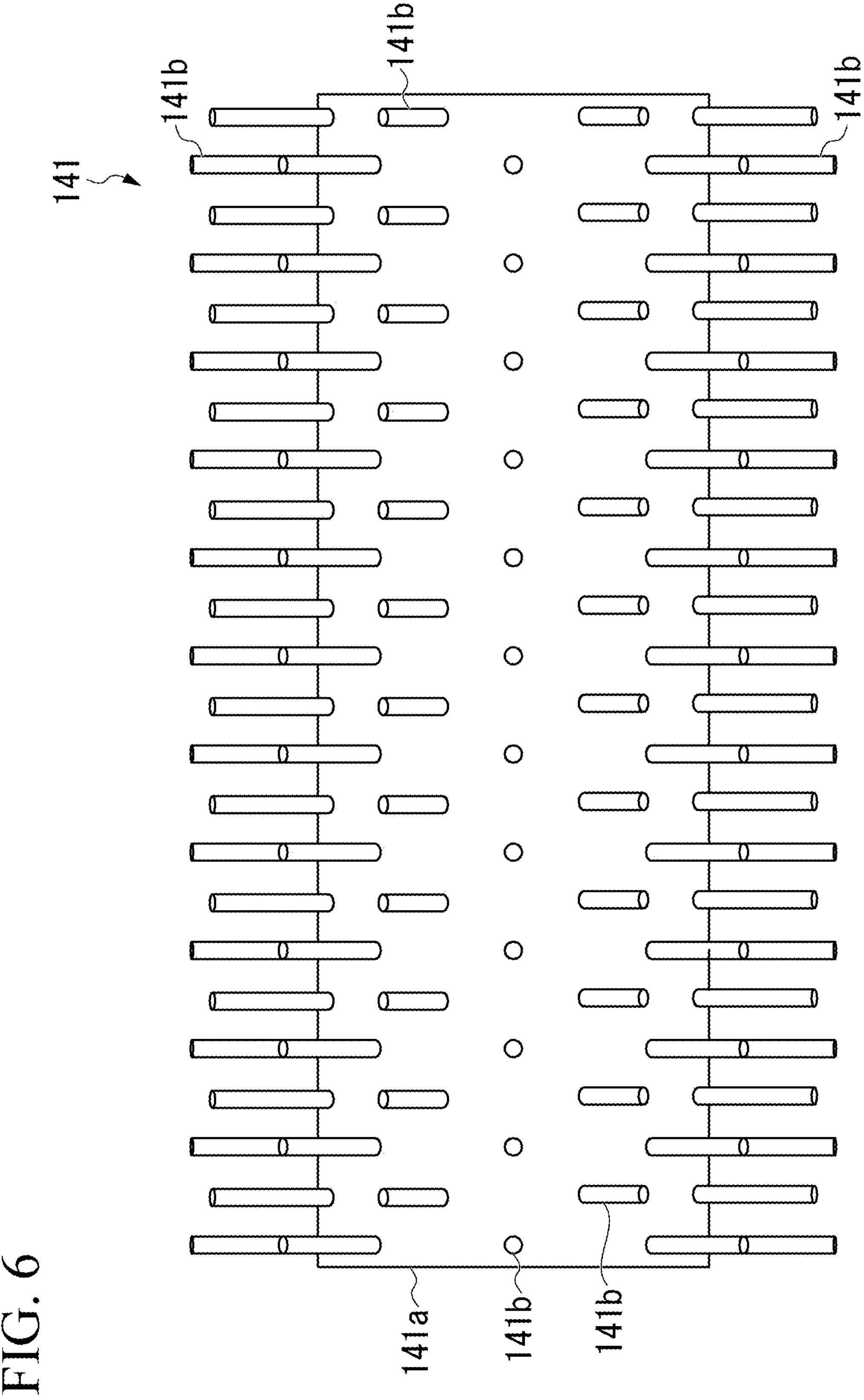
FIG. 6 is a schematic diagram of pin rolls provided in the fragmentation-processing apparatus.

As shown in FIG. 6, the first pin roll 141 has a cylinder 141*a* and a plurality of pins 141*b* arranged on the circumferential surface of the cylinder 141*a*. The plurality of pins 141*b* preferably all have the same shape and dimensions as each other.

The cylinder 141*a* and the pins 141*b* are both rigid bodies and are formed, for example, of a metal material. Examples of metal materials include steel, stainless steel, and aluminum alloys, without being limited thereto.

The diameter of the cylinder 141*a* is not limited, but may be, for example, 60 mm to 150 mm.

The pins 141*b* extend perpendicularly to the rotation axis of the first pin roll 141 and have, for example, a cylindrical shape, without being limited thereto. The boundary between the end surface and the circumferential surface of the pins 141*b* may be chamfered.

The diameter of the pins 141*b* is not limited, but may be, for example, 1 mm to 5 mm.

The length $L_{P1}$ of the pins 141*b*, that is, the distance from the pin tip to the base, is not limited, but may be, for example, 10 mm to 50 mm.

In a plane development of the circumferential surface of the cylinder 141*a*, the arrangement of the pins 141*b* on the circumferential surface preferably overlaps with the original arrangement when shifted 5 mm to 20 mm in the axial direction and 4 mm to 30 mm in the circumferential direction.

Figure 7:
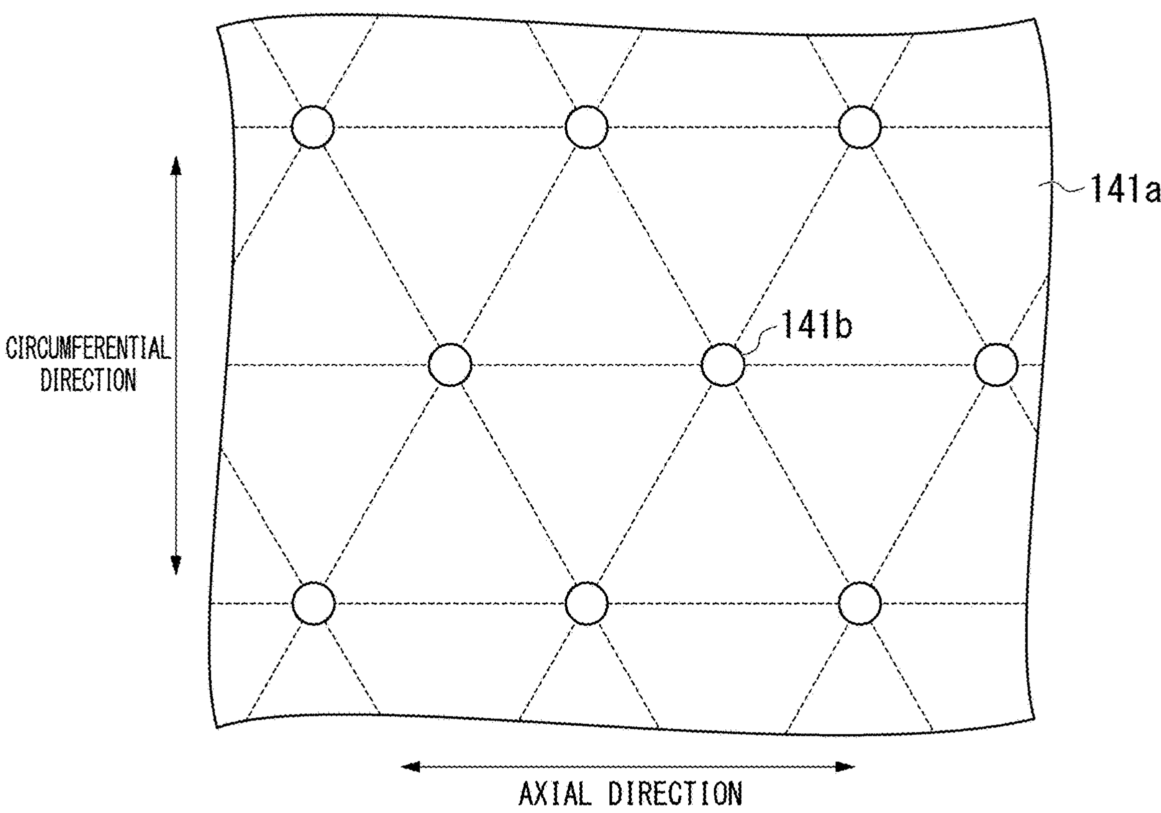
FIG. 7 shows a part of a plane development of the circumferential surface of a pin roll.

For example, in the case of the first pin roll 141 shown in FIG. 6, in a plane development of the circumferential surface of cylinder 141*a*, the pins 141*b* are arranged at each vertex of tessellating equilateral triangles (displayed with dashed lines) each having one side parallel to the axial direction, as shown in FIG. 7. When the length of one side of this equilateral triangle is, for example, 5 mm, the arrangement of the pins 141*b* shown in FIG. 7 overlaps with the original arrangement when shifted in the axial direction by 2.5 mm and approximately 4.3 mm in the circumferential direction.

In the present specification, the maximum radius of a pin roll is defined as the distance from the rotation axis thereof to the pin tip. In the first pin roll 141, the radius of the cylinder 141*a* is preferably half or more of the maximum radius of the first pin roll 141 and more preferably 75% or more. This is because the higher the ratio of the cylinder radius to the maximum radius of the pin roll, the smaller the difference between the circumferential speed at the pin tip and the circumferential speed at the base of the pin when the pin roll is rotating.

In one example, it is possible to use a magnetic body for the material of the pins 141*b*. The pins 141*b* are firmly fixed to the cylinder 141*a* so as to prevent falling out during production, but even when a situation occurs in which the pins 141*b* do fall out and get mixed into the CF-SMC, when the pins 141*b* include a magnetic body, it is possible to easily find the pins 141*b* using a magnetic sensor type metal detector.

Suitable examples of magnetic bodies include steel and magnetic stainless steels.

Among various stainless steels, austenitic stainless steels belonging to chromium-nickel stainless steels (typical steel grades are 18Cr-8Ni stainless steels such as SUS304 of the Japanese Industrial Standards) do not have a magnetic property.

On the other hand, austenitic ferritic stainless steels belonging to chromium-nickel stainless steels (typical steel grades are SUS329J1 and SUS329J4L of the Japanese Industrial Standards), ferritic stainless steels belonging to chromium stainless steels (typical steel grades are 18 Cr stainless steels such as SUS430 of the Japanese Industrial Standards), martensitic stainless steels (typical steel grades are 13Cr stainless steels such as SUS410 of the Japanese Industrial Standards), and precipitation hardening stainless steels (typical steel grades are SUS630 and SUS631 of the Japanese Industrial Standards) are magnetic bodies.

All of the above regarding the first pin roll 141 also applies to the second pin roll 142.

Without imposing any limitation, in order to reduce the cost of designing, manufacturing, and maintaining the fragmentation-processing apparatus 140, it is preferable to match the design and specifications of the first pin roll 141 and the second pin roll 142 in as many items as possible, including axial direction length, maximum radius, cylinder diameter, pin shape, dimensions, number, and arrangement, as well as the cylinder and pin materials.

Figure 8:
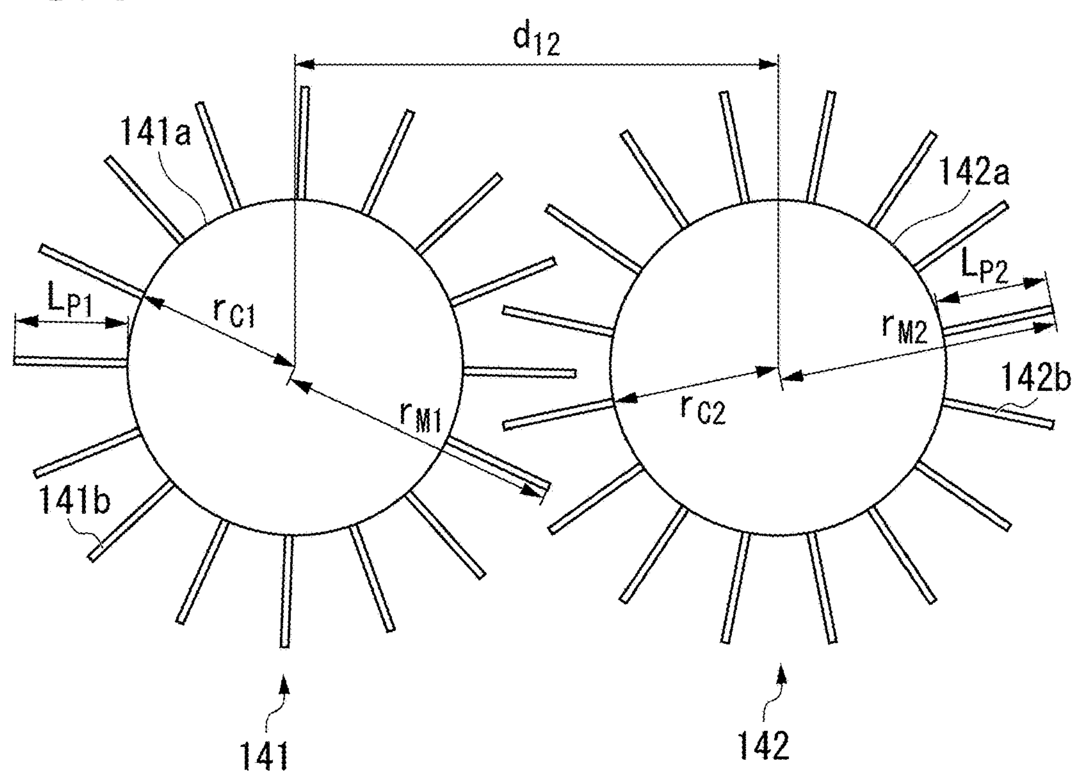
FIG. 8 is a schematic diagram showing the positional relationship and the like of two pin rolls provided in the fragmentation-processing apparatus.

When a greater number of the chopped carbon fiber bundles 20 pass between the first pin roll 141 and the second pin roll 142, in order for the chopped carbon fiber bundles 20 to be struck by the pins of these pin rolls, as shown in FIG. 8, the sum of the maximum radius $r_{M1}$ of the first pin roll 141 and the maximum radius $r_{M2}$ of the second pin roll 142 is preferably greater than the distance $d_{12}$ between the rotation axes of these two pin rolls.

The sum of the maximum radius $r_{M1}$ of the first pin roll 141 and a cylinder radius $r_{C2}$ of the second pin roll 142 and the sum of the cylinder radius $r_{C1}$ of the first pin roll 141 and the maximum radius $r_{M2}$ of the second pin roll are both smaller than the distance $d_{12}$ between the rotation axes of the two pin rollers.

In one example, the distance $d_{12}$ between the rotation axes of the first pin roll 141 and the second pin roll 142 may be variable. That is, it is possible to configure the fragmentation-processing apparatus 140 such that the position of one or both of the rotation axes of the first pin roll 141 and the second pin roll 142 is able to be moved horizontally along the travel direction of the first carrier film 41.

Both the first pin roll 141 and the second pin roll 142 are driven to rotate by a driving mechanism (not shown). As shown in FIG. 5, the first pin roll 141 rotates such that the pins 141*b* move downward from above on the side facing the second pin roll 142, and the second pin roll 142 rotates such that pins 142*b* move downward from above on the side facing the first pin roll 141.

Rotating both the first pin roll 141 and the second pin roll 142 is advantageous in ensuring that the chopped carbon fiber bundle 20 does not become jammed between these two pin rolls.

It is possible to independently control the rotation speeds of the first pin roll 141 and the second pin roll 142.

In the first pin roll and second pin roll, the longer the pins, the higher the density of pins on the cylinder surface, and the higher the circumferential speed, the greater the efficiency of the fragmentation-processing. In addition, the longer the pins, the higher the density of pins on the cylinder surface, and the higher the circumferential speed, the stronger the airflow generated by the rotation of these pin rolls.

In a preferable example, the length of the pins, the density of the pins on the cylinder surface, and the circumferential speed in the first pin roll and second pin roll are adjusted such that the generated airflow is as weak as possible in a range where the efficiency of the fragmentation-processing is not significantly decreased.

The fragmentation-processing apparatus 140 is arranged directly under the chopper 130 such that the chopped carbon fiber bundle 20 produced by the cutting of the continuous carbon fiber bundle 10 by the chopper 130 passes between the first pin roll 141 and the second pin roll 142 and falls on the first carrier film 41. Preferably, the cutter roll 131 and the receiving roll 132 are in contact directly above the gap between the cylinder 141*a* of the first pin roll and a cylinder 142*a* of the second pin roll.

The lower partition 150 perpendicular to the T direction is arranged below the fragmentation-processing apparatus 140. The lower partition 150 is a flat plate and the thickness direction thereof is parallel to the T direction. In other words, the normal line of the lower partition 150 is parallel to the T direction.

Figure 9:
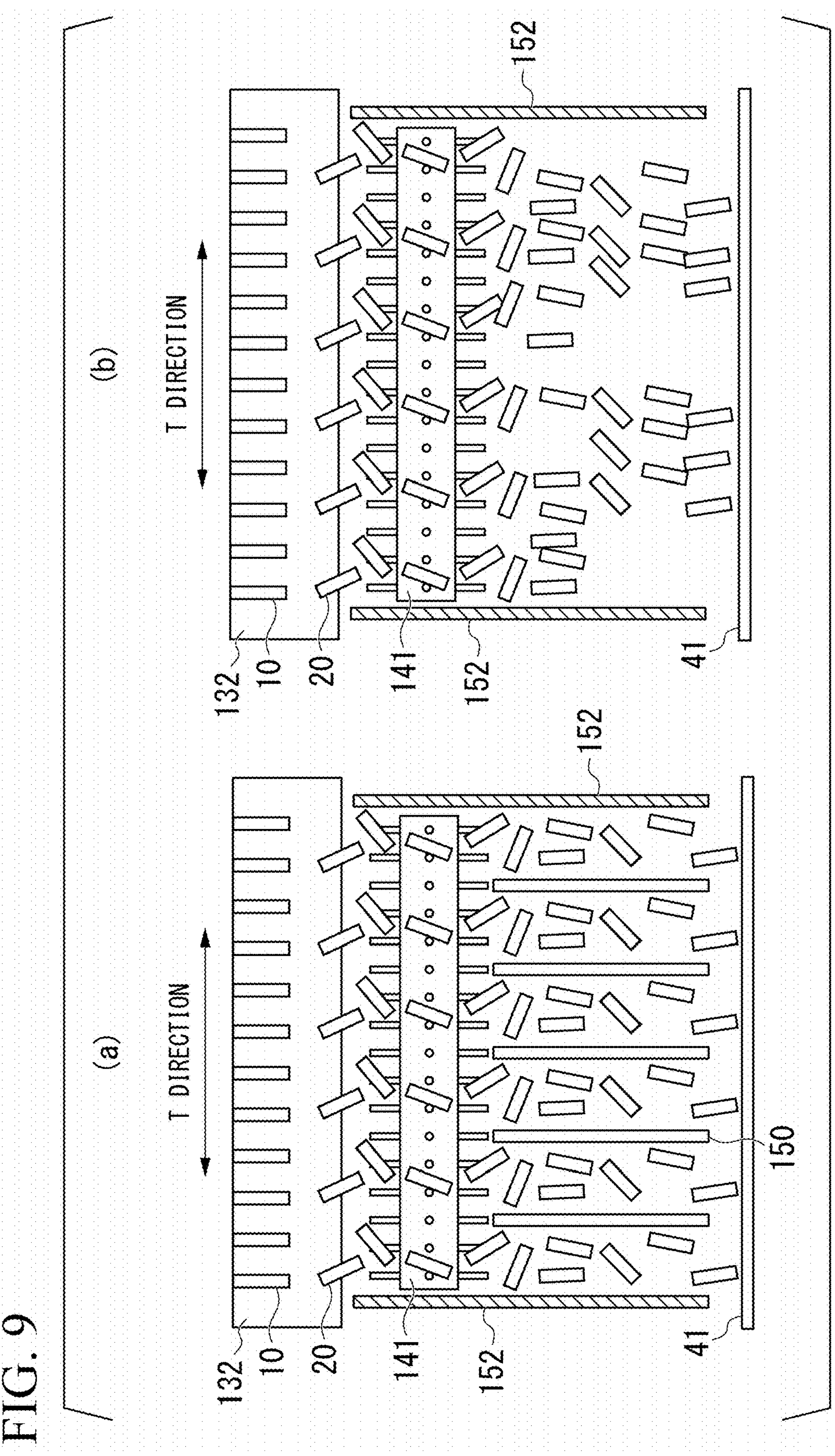
FIG. 9 is a schematic diagram for illustrating the operation of the lower partition. In each of FIGS. 9(*a*) and 9(*b*), the travel direction of the first carrier film 41 is perpendicular to the paper surface.

As shown in FIG. 9(*a*), when the space below the fragmentation-processing apparatus 140 is partitioned into a plurality of regions along the T direction by one or more of the lower partitions 150, the movement of the chopped carbon fiber bundle 20 along the T direction in this space is restricted in each region. As a result, when a plurality of continuous carbon fiber bundles 10 are supplied to the chopper 130 such that the number of those to be cut per axial direction length of the cutter roll 131 is constant, the amount of chopped carbon fiber bundles 20 falling on the first carrier film 41 per unit time can be uniform along the T direction. As a result, the areal weight of the carbon fiber mat 30 deposited on the first carrier film 41 becomes uniform in the T direction.

In contrast, when the lower partitions 150 are not arranged, the movement of the chopped carbon fiber bundle 20 in the T direction in the space below the fragmentation-processing apparatus 140 is not restricted, thus, the amount of chopped carbon fiber bundle 20 falling on the first carrier film 41 per unit time varies significantly along the T direction due to the influence of the airflow produced by the rotation of the first pin roll 141 and the second pin roll 142, as schematically shown in FIG. 9(*b*).

The lower partitions 150 may preferably be metal plates, without being limited thereto. The lower partitions 150 may be perforated plates or nets, as long as the movement of the chopped carbon fiber bundle 20 is impeded.

It is desirable for the lower partitions 150 to have enough strength to not flap in the airflow produced by the rotation of the first pin roll 141 and the second pin roll 142, but being excessively thick is not desirable. For example, when metal plates are used for the lower partitions 150, the thickness thereof is preferably 5 mm or less, and more preferably 3 mm or less.

Figure 10:
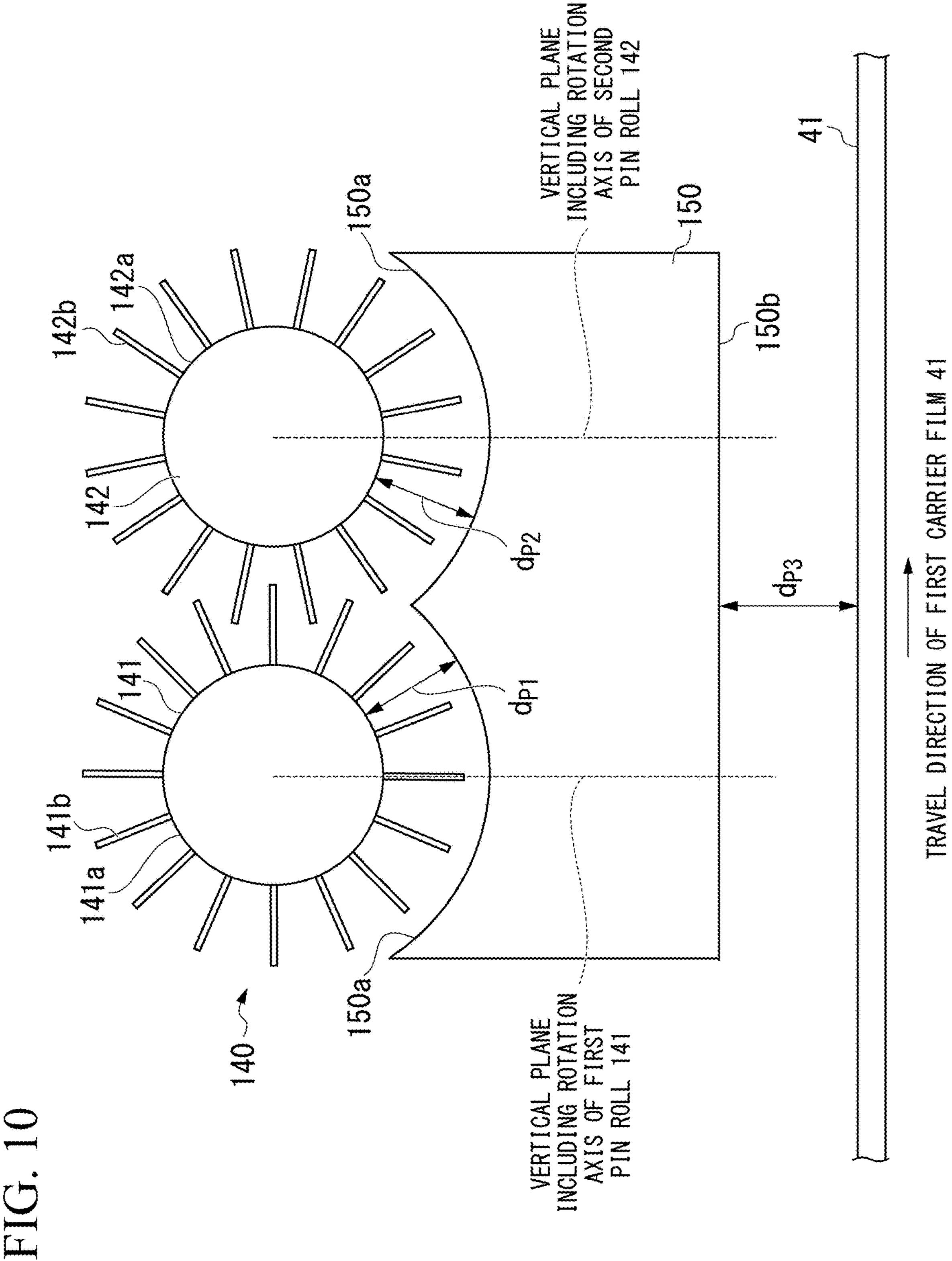
FIG. 10 shows the positional relationship and the like between the fragmentation-processing apparatus, the first carrier film, and the lower partition.

Referring to FIG. 10, a preferred embodiment for arranging the lower partition 150 will be explained as follows.

First, the lower partition 150 preferably extends along the travel direction of the first carrier film 41 so as to intersect both a vertical plane including the rotation axis of the first pin roll 141 and a vertical plane including the rotation axis of the second pin roll 142. This is because most of the chopped carbon fiber bundles 20 falling on the first carrier film 41 fall through the region sandwiched between these two vertical planes.

Second, at any location on an upper edge 150*a* of the lower partition 150, a distance dpi from the circumferential surface of the cylinder 141*a* of the first pin roll is preferably greater than the length $L_{P1}$ of the pin 141*b* of the first pin roll, and a distance $d_{P2}$ from the circumferential surface of the cylinder 142*a* of the second pin roll is preferably greater than the length $L_{P2}$ of the pins 142*b* of the second pin roll. The difference between the distance $d_{P1}$ and the length $L_{P1}$ of the pins 141*b* of the first pin roll and the difference between the distance $d_{P2}$ and the length $L_{P2}$ of the pins 142*b* of the second pin roll are preferably both 0.1 cm or more and more preferably 0.5 cm or more.

When the pin rolls are rotated, the pin tips of the pin rolls and the upper edge of the lower partition are preferably always separated by 0.1 cm or more and more preferably 0.5 cm or more, so as to avoid fuzz due to strong shear forces caused by the chopped carbon fiber bundles being sandwiched between the pin rolls and the lower partition and to avoid the chopped carbon fiber bundles becoming jammed between the pin rolls and the lower partition.

Furthermore, at least between the vertical plane including the rotation axis of the first pin roll 141 and the vertical plane including the rotation axis of the second pin roll 142, at least one of the following first condition and second condition is able to be satisfied at any location on the upper edge 150*a* of the lower partition 150.

First condition: the distance dpi from the circumferential surface of the cylinder 141*a* of the first pin roll is less than the length $L_{P1}$ of the pins 141*b* of the first pin roll plus 3 cm, preferably less than $L_{P1}$ plus 2 cm, and more preferably less than $L_{P1}$ plus 1.2 cm.

Second condition: the distance $d_{P2}$ from the cylinder 142*a* of the second pin roll is less than the length $L_{P2}$ of the pins 141*b* of the second pin roll plus 3 cm, preferably less than $L_{P2}$ plus 2 cm, and more preferably less than $L_{P2}$ plus 1.2 cm.

Figure 23:
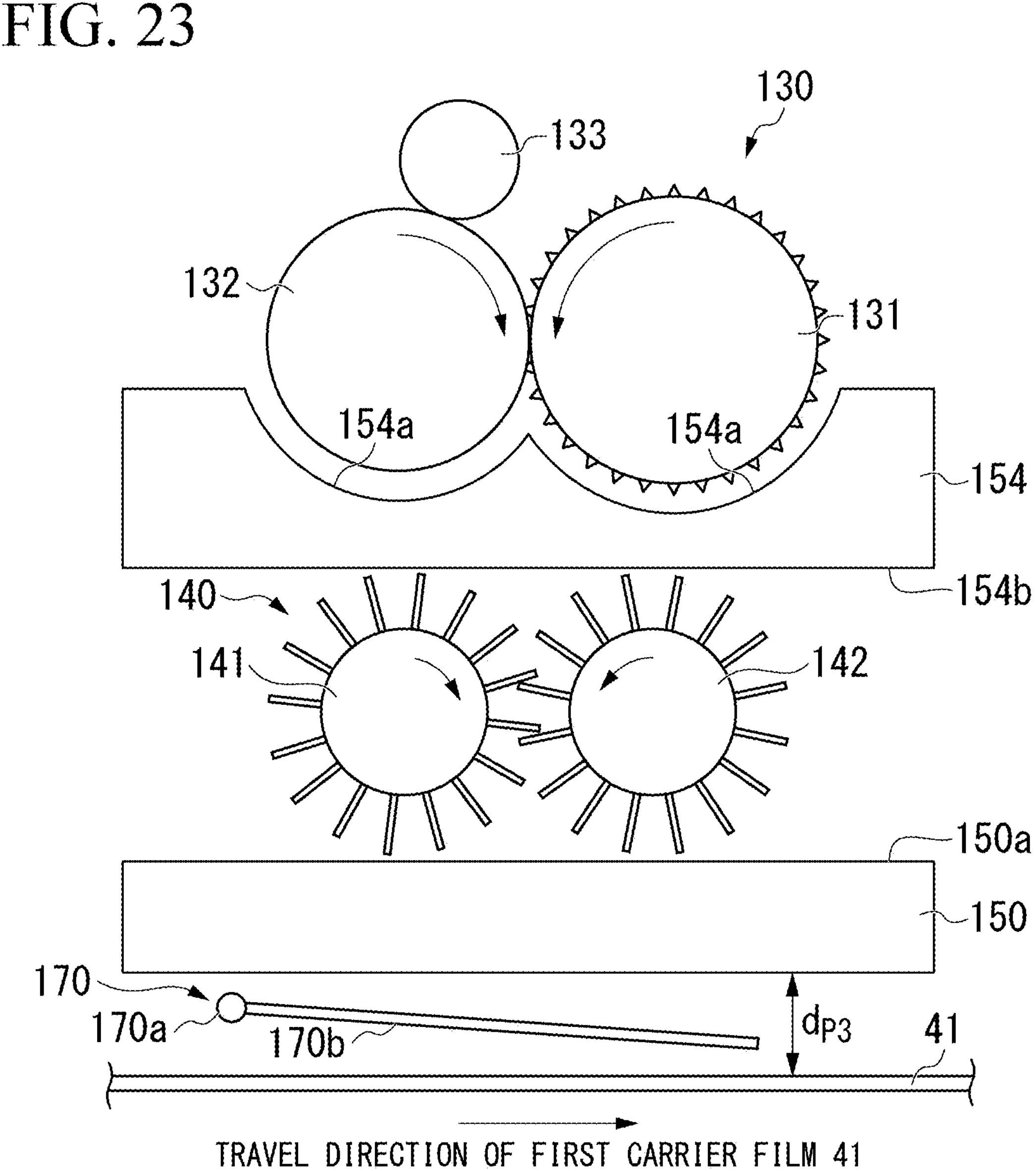
FIG. 23 shows the positional relationship and the like between the chopper, the fragmentation-processing apparatus, the first carrier film, the lower partition, and the upper partition.

As another example, when the distance $d_{12}$ between the rotation axes of the first pin roll 141 and the second pin roll 142 is variable, all or a part of the upper edge 150*a* of the lower partition 150 may be made to be horizontal such that one or both of the first pin roll 141 and the second pin roll 142 can be moved horizontally along the travel direction of the first carrier film 41. In the example shown in FIG. 23, all of the upper edge 150*a* of the lower partition 150 is horizontal.

Third, at least between the vertical plane including the rotation axis of the first pin roll 141 and the vertical plane including the rotation axis of the second pin roll 142, at any location on a lower edge 150*b* of the lower partition 150, a distance $d_{P3}$ to the first carrier film 41 is preferably 20 cm or less, more preferably 15 cm or less, and even more preferably 10 cm or less.

The distance $d_{P3}$ may be set to, for example, 5 cm or more such that it is possible to have a sufficient gap between the lower edge 150*b* of the lower partition and the carbon fiber mat deposited on the first carrier film 41.

In the example of FIG. 10, the front edge of the lower partition 150, that is, the edge on the travel direction side of the first carrier film 41, and the rear edge of the lower partition 150, that is, the edge on the opposite direction side to the travel direction of the first carrier film 41, are both straight and vertical. Such a configuration is preferable, but not required.

As shown in FIG. 11, a plurality of the lower partitions 150 are preferably lined up along the T direction. This is because, by doing so, the range of the movement of the chopped carbon fiber bundles along the T direction during falling toward the first carrier film 41 is narrower.

The pitch P of the plurality of the lower partitions 150 lined up along the T direction is preferably 20 cm or less, more preferably 15 cm or less, even more preferably cm or less, and may be 7.5 cm or less or 5 cm or less.

The pitch P is preferably two or more times as long as the fiber length of the chopped carbon fiber bundle 20 produced when the continuous carbon fiber bundle 10 is cut by the chopper 130 and more preferably three or more times as long. Setting the pitch P in this manner makes it more difficult for the chopped carbon fiber bundles to be oriented along the lower partition 150 when being deposited on the first carrier film 41.

In order to make it difficult for the chopped carbon fiber bundle to be oriented along the lower partition 150, the lower partition 150 may be corrugated such that the horizontal cross-section has a wave shape at least in part, preferably, at least in a part sandwiched between the vertical plane including the rotation axis of the first pin roll 141 and the vertical plane including the rotation axis of the second pin roll 142. When the lower partition 150 is corrugated, the orientation of the chopped carbon fiber bundles 20 falling after impacting or contacting the lower partition 150 changes in various ways depending on the manner of impact or contact, thus, in the carbon fiber mat 30 deposited on the first carrier film 41, it is difficult to lose the randomness of the fiber bundle orientation.

Figure 12:
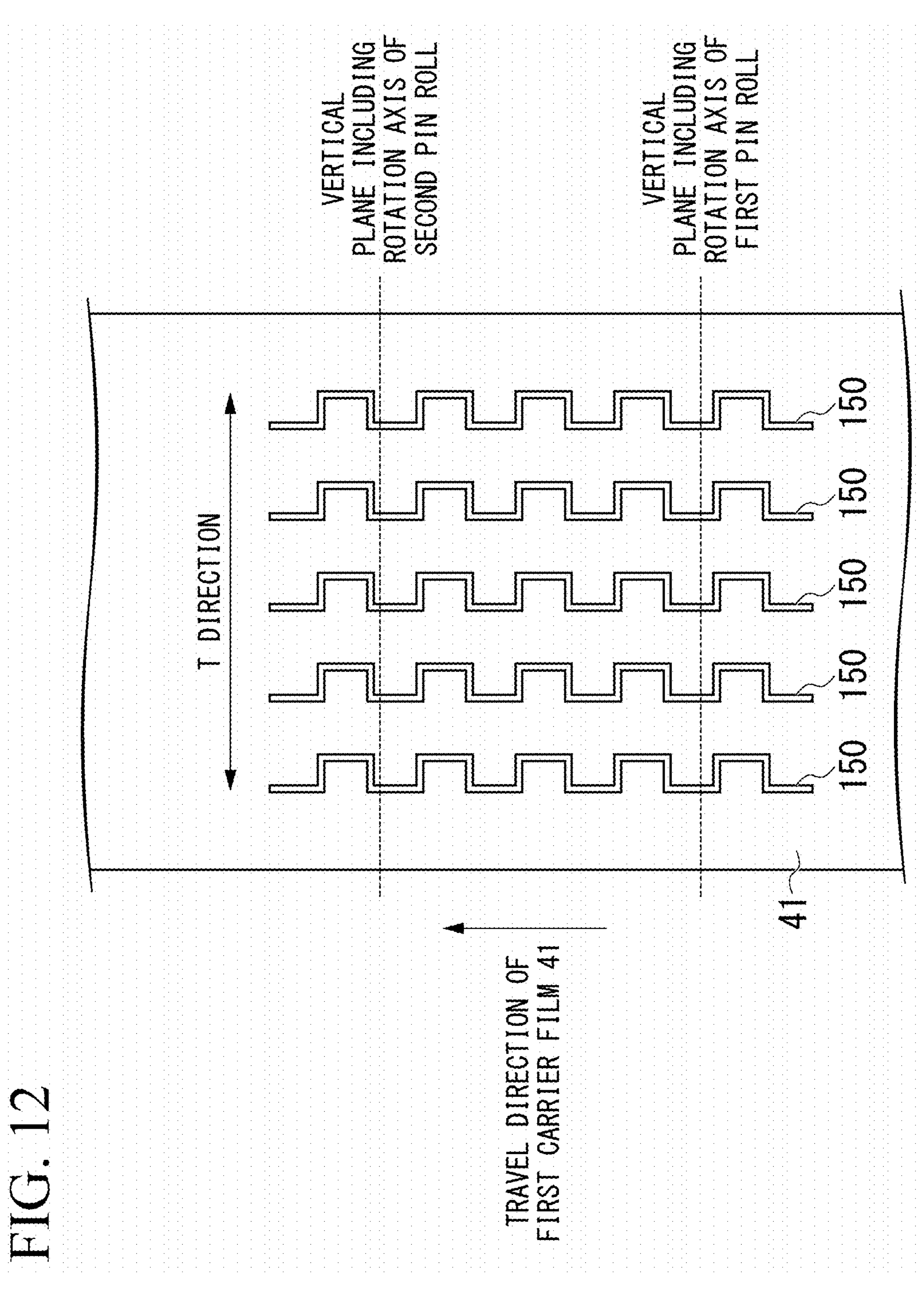
FIG. 12 is a plan view showing a plurality of lower partitions perpendicular to the T direction being lined up along the T direction.

An example in which the lower partition 150 is corrugated such that the horizontal cross-section has a rectangular waveform is shown in FIG. 12. The corrugation is not limited to a rectangular wave, but may be a sine wave, a triangular wave, a trapezoidal wave, or the like.

Figure 24:
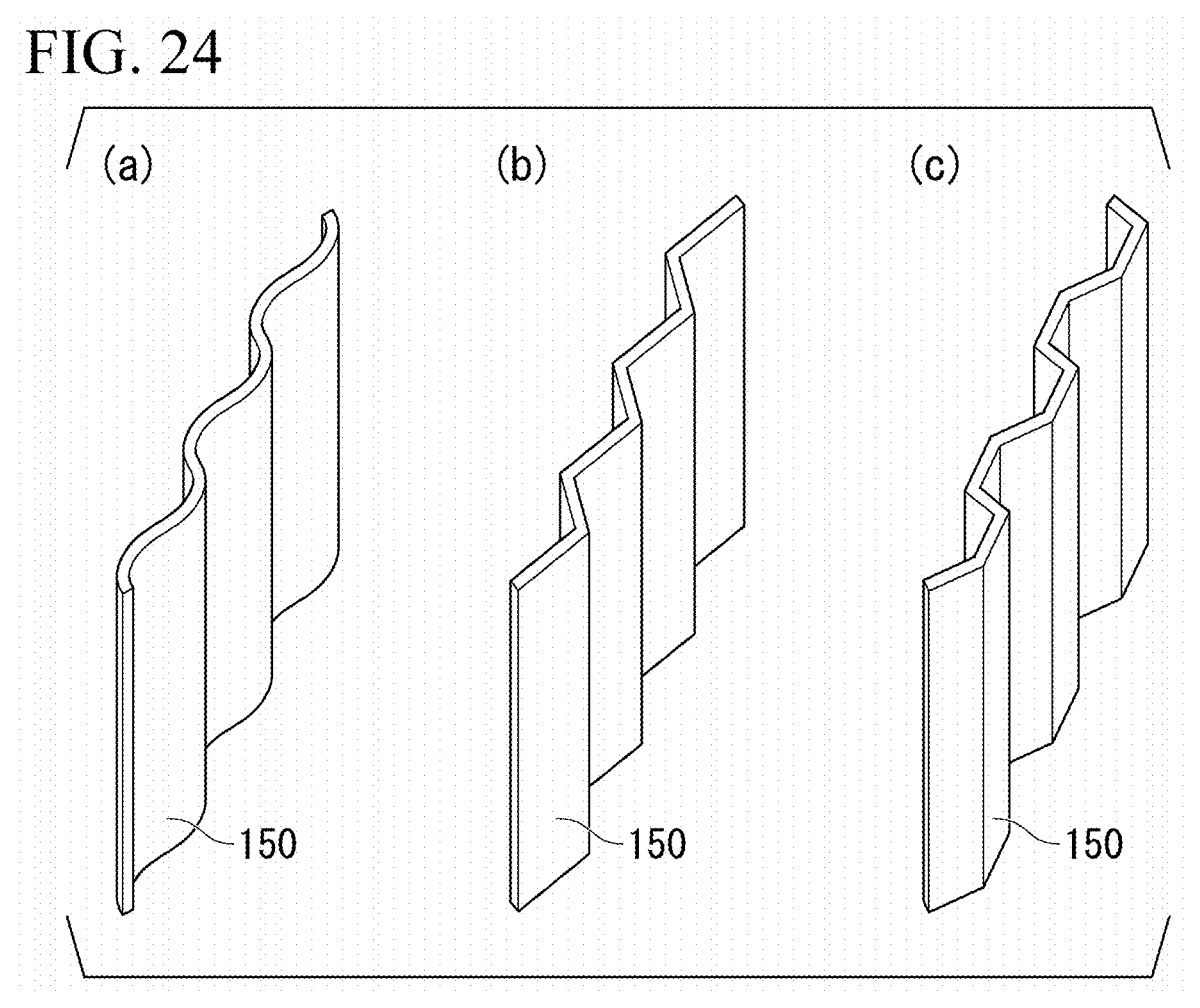

FIGS. 24(*a*) to 24(*c*) show examples of wave plates in which the shape of the horizontal cross-section is a sine wave, a triangular wave, and a trapezoidal wave, respectively.

It is possible to set the pitch and height of the corrugation to be the same as the fiber length of the chopped carbon fiber bundle, for example, without being limited thereto. It is possible to optimize the above by trial and error depending on the waveform of the corrugation.

When the lower partition 150 is flat and completely perpendicular to the T direction, when passing under the fragmentation-processing apparatus 140, a part that travels directly under the lower partition 150 from beginning to end is produced on the first carrier film 41. As a result, in such parts, the thickness of the carbon fiber mat 30 deposited on the first carrier film 41 may be smaller locally.

Figure 25:
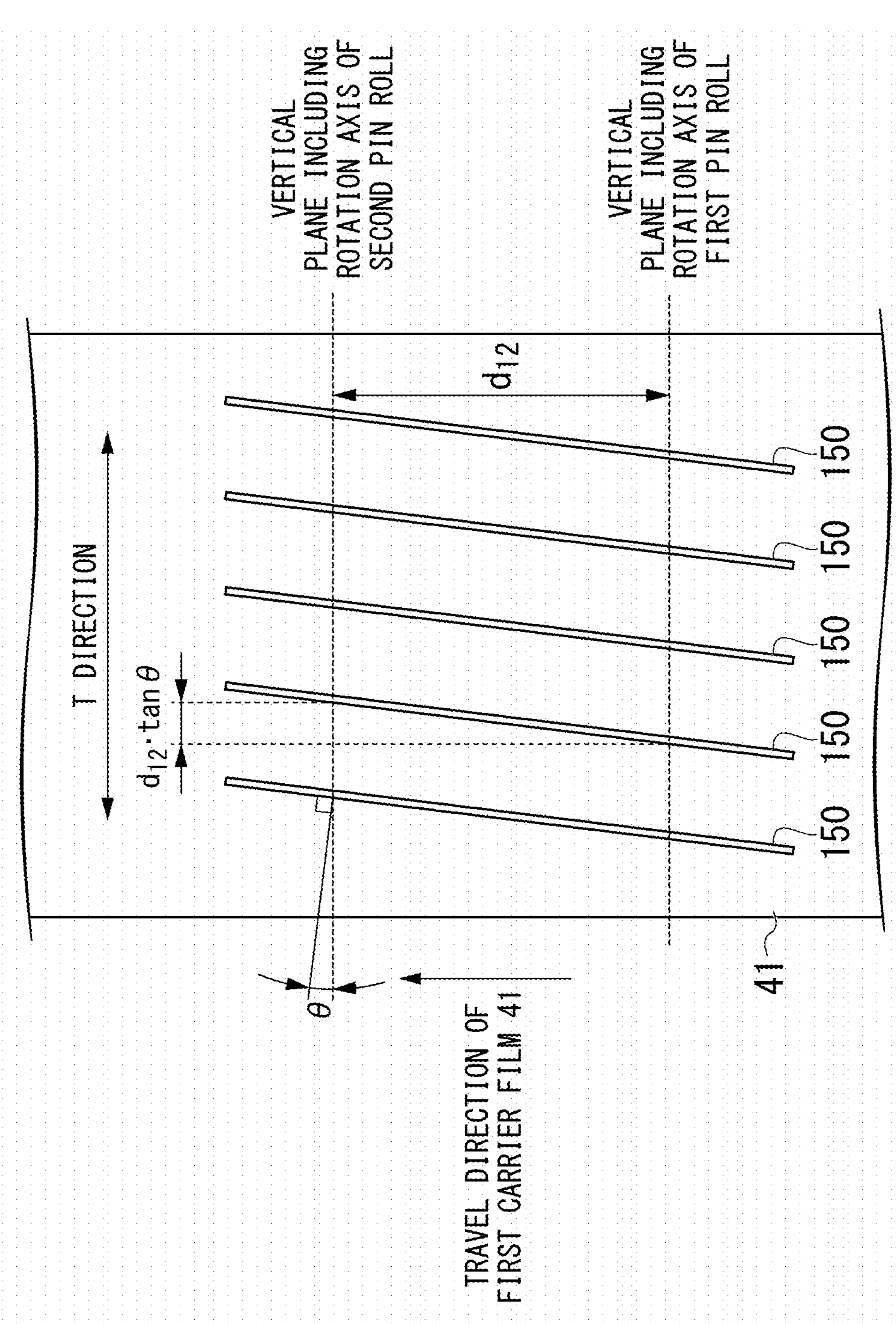
FIG. 25 is a plan view showing a plurality of lower partitions each with the normal line inclined from the T direction in the horizontal plane being lined up along the T direction.

To prevent such a situation, at least at a part of the lower partition 150, preferably, at least at a part sandwiched between a vertical plane including the rotation axis of the first pin roll 141 and a vertical plane including the rotation axis of the second pin roll 142, it is possible to incline the normal line of the lower partition 150 from the T direction in the horizontal plane. FIG. 25 shows an example thereof. The inclination angle θ may be 1° or more, 5° or more, 10° or more, 15° or more, or 20° or more, as well as 45° or less, 40° or less, or 35° or less, without being limited thereto.

In the example shown in FIG. 25, the plurality of lower partitions 150 are parallel to each other, but such a configuration is not required. When inclining the normal line of the plurality of lower partitions 150 from the T direction in the horizontal plane, it is not necessary for the lower partitions 150 to be parallel to each other.

When the lower partition 150 is completely perpendicular to the T direction, the width of the region where the deposited amount of the chopped carbon fiber bundle 20 is reduced due to being in the shadow of the lower partitions 150 is estimated to be approximately the same as the length of the chopped carbon fiber bundle 20. Taking the above into consideration, it is possible to determine the inclination angle θ when the normal line of the lower partition 150 is inclined from the direction Tin the horizontal plane such that Expression (1) is satisfied.

$$d_{12}\cdot\tan\theta \geq a\cdot L_F \quad (1)$$

In Expression (1), $d_{12}$ is the distance between the rotation axes of the first pin roll 141 and the second pin roll 142, and $L_F$ is the fiber length of the chopped carbon fiber bundle 20.

The coefficient a is preferably 1 and more preferably 2.

Accordingly, when the fiber length $L_F$ of the chopped carbon fiber bundle 20 is 1.3 cm, $d_{12}\cdot\tan\theta$ is preferably 1.3 cm or more and more preferably 2.6 cm or more.

Depending on the angle between the cutting plane of the chopped carbon fiber bundle 20 at both ends and the fiber direction, the length of the chopped carbon fiber bundle 20 may exceed the fiber length thereof and thus it is desirable to also consider this point when setting θ.

Instead of inclining the normal line of the lower partition 150 from the direction T in the horizontal plane, at least a part of the lower partition 150, preferably, at least the part sandwiched between the vertical plane including the rotation axis of the first pin roll 141 and the vertical plane including the rotation axis of the second pin roll 142, is corrugated such that the horizontal cross-section has a wave shape to obtain the same effect. The waveform may be a rectangular wave, preferably a trapezoidal wave, more preferably a sine wave, and most preferably a triangular wave.

It is desirable for the period of the corrugation to be sufficiently large compared to the length of the chopped carbon fiber bundle 20 and thus twice or more the fiber length $L_F$ of the chopped carbon fiber bundle 20 is preferable.

In one example, as shown in FIG. 13, all of the lower partitions 150 may be arranged inside an enclosure 152.

The enclosure 152 is comprises two side walls 152*a* parallel to the travel direction of the first carrier film 41 and a front wall 152*b* and a rear wall 152*c* parallel to the T direction.

The position of the upper end of the enclosure 152 may be higher than the upper ends of the first pin roll 141 and the second pin roll 142 provided in the fragmentation-processing apparatus 140. That is, the enclosure 152 may surround the lower partition 150 at the lower part thereof and surround the first pin roll 141 and the second pin roll 142 at the upper part thereof.

When the fragmentation-processing apparatus 140 has the covers 143, as in the example shown in FIG. 5, the upper part of the enclosure 152 may surround the first pin roll 141 and the second pin roll 142 along with the covers 143, or the upper part of the enclosure 152 may be integrated with the covers 143 to surround the first pin roll 141 and the second pin roll 142.

The inner dimension in the T direction at the lower end of the enclosure 152, that is, a distance WE between the lower edges of the two side walls 152*a*, is usually less than the width of the first carrier film 41. When the lower edges of the two side walls 152*a* of the enclosure 152 are brought sufficiently close to the first carrier film 41, the width of the carbon fiber mat 30 deposited on the first carrier film 41 is approximately the same as the distance WE between the lower edges of the two side walls 152*a*.

The distance from the lower edges of the two side walls 152*a* of the enclosure 152 to the upper surface of the first carrier film 41 is preferably equal to or less than the distance from the lower edge 150*b* of the lower partition to the upper surface of the first carrier film 41.

The lower partition 150 may be connected to each of the front wall 152*b* and the rear wall 152*c* of the enclosure without gaps.

In order to prevent the chopped carbon fiber bundles from orienting along the enclosure 152, at least a part of the enclosure 152 may be corrugated such that the horizontal cross-section has a wave shape.

It is possible to set the pitch and height of the corrugation to be the same as the fiber length of the chopped carbon fiber bundle, for example, without being limited thereto.

As a modification example, the other parts of the enclosure 152 may be removed, leaving only all or a part of each of the side walls 152*a*, such that the function of regulating the width of the carbon fiber mat 30 formed on the first carrier film 41 in the T direction is not lost. This modification has the advantage of facilitating the detection and repair of defects occurring in the lower partition 150, as well as facilitating the removal of cotton fiber debris attached to the lower partition.

Figure 14:
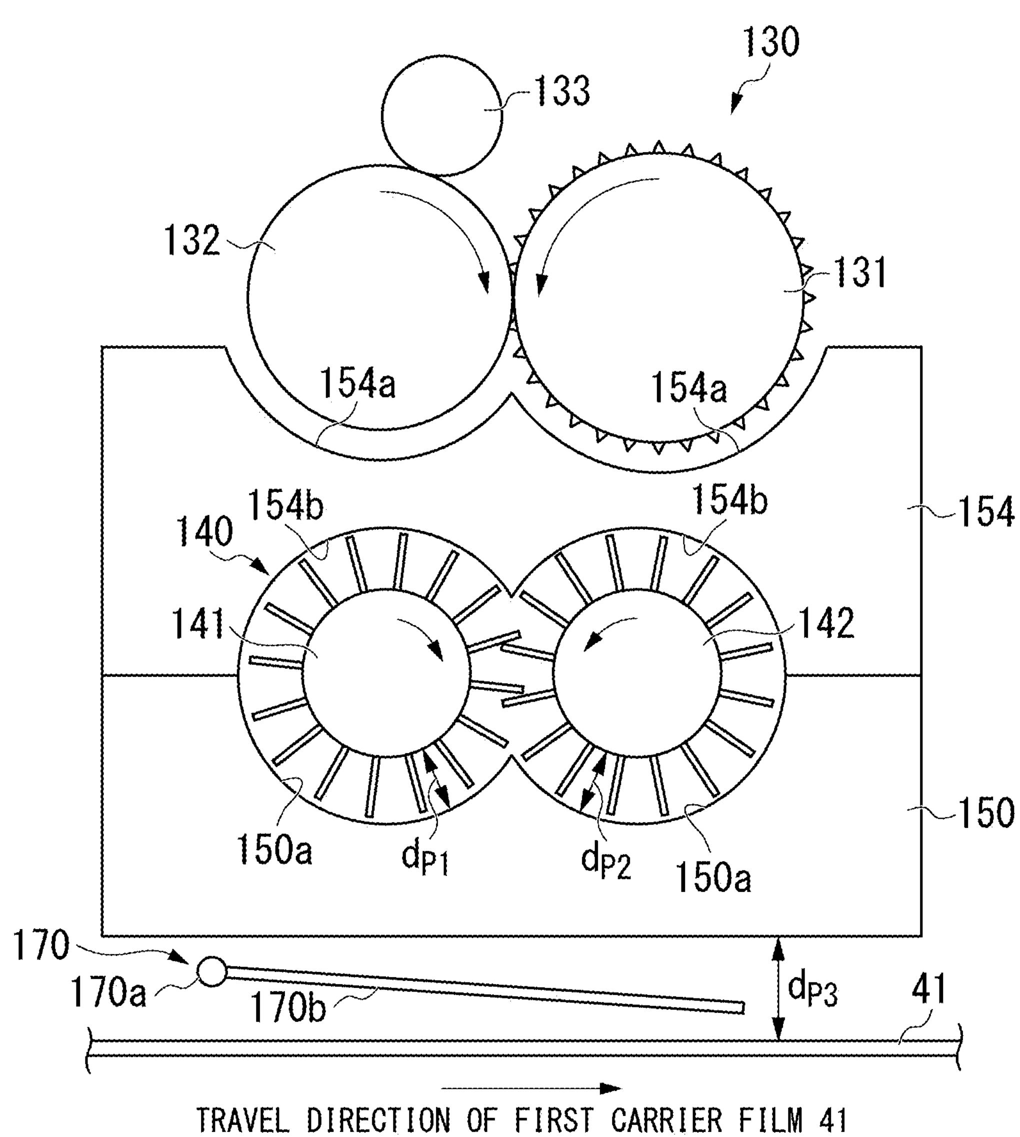
FIG. 14 shows the positional relationship and the like between the chopper, the fragmentation-processing apparatus, the first carrier film, the lower partition, and the upper partition.

In a suitable example, as shown in FIG. 14, an upper partition 154 perpendicular to the T direction may be arranged above the fragmentation-processing apparatus 140, that is, in the space between the chopper 130 and the fragmentation-processing apparatus 140.

In the example of FIG. 14, the upper edge 150*a* of the lower partition 150 and a lower edge 154*b* of the upper partition 154 each have a horizontal section at both ends and the former and the latter butt up against each other at the horizontal section. Such a configuration is preferable, but not required. In other examples, the positions of the lower partition 150 and the upper partition 154 may be shifted from each other in the T direction.

The objective of the upper partition 154 is to prevent the chopped carbon fiber bundle 20 from moving in the T direction due to the airflow produced by the rotation of the first pin roll 141 and the second pin roll 142 when falling from the chopper 130 toward the fragmentation-processing apparatus 140, thereby further improving the uniformity of the areal weight in the T direction of the carbon fiber mat deposited on the first carrier film 41 compared to a case of using only the lower partition 150.

The following is a description of a preferred embodiment when arranging the upper partition 154.

First, similarly to the lower partition 150, the upper partition 154 preferably extends along the travel direction of the first carrier film 41 so as to intersect both the vertical plane including the rotation axis of the first pin roll 141 and the vertical plane including the rotation axis of the second pin roll 142.

Second, at any location on the lower edge 154*b* of the upper partition 154, the distance $d_{P1}$ from the circumferential surface of the cylinder 141*a* of the first pin roll is preferably greater than the length $L_{P1}$ of the pins 141*b* of the first pin roll and the distance $d_{P2}$ from the circumferential surface of the cylinder 142*a* of the second pin roll is preferably greater than the length $L_{P2}$ of the pins 142*b* of the second pin roll.

The difference between the distance $d_{P1}$ and the length $L_{P1}$ of the pins 141*b* of the first pin roll and the difference between the distance $d_{P2}$ and the length $L_{P2}$ of the pins 142*b* of the second pin roll are preferably both 0.1 cm or more and more preferably 0.5 cm or more.

When the pin roll is rotated, the pin tips of the pin roll and the lower edge of the upper partition are preferably separated by 0.1 cm or more and more preferably by 0.5 cm or more so as to avoid the generation of fuzz caused by the strong shear force upon the chopped carbon fiber bundle sandwiched between the pin roll and the upper partition and to avoid the chopped carbon fiber bundles becoming jammed between the pin rolls and the upper partition.

Furthermore, at least between the vertical plane including the rotation axis of the first pin roll 141 and the vertical plane including the rotation axis of the second pin roll 142, at least one of the following third condition and fourth condition may be satisfied at any location on the lower edge 154*b* of the upper partition 154.

Third condition: the distance $d_{P1}$ from the circumferential surface of the cylinder 141*a* of the first pin roll is less than the length $L_{P1}$ of the pins 141*b* of the first pin roll plus 3 cm, preferably less than $L_{P1}$ plus 2 cm, more preferably less than $L_{P1}$ plus 1.2 cm.

Fourth condition: The distance $d_{P2}$ from the circumferential surface of cylinder 142*a* of the second pin roll is less than the length $L_{P2}$ of the pins 141*b* of the second pin roll plus 3 cm, preferably less than $L_{P2}$ plus 2 cm, more preferably less than $L_{P2}$ plus 1.2 cm.

As another example, when the distance $d_{12}$ between the rotation axes of the first pin roll 141 and second pin roll 142 is variable, all or a part of the lower edge 154*b* of the upper partition 154 may be made horizontal such that either or both of the first pin roll 141 and second pin roll 142 may be moved horizontally along the travel direction of the first carrier film 41. In the example shown in FIG. 23, the lower edge 154*b* of the upper partition 154 is entirely horizontal.

Third, at least between the vertical plane including the rotation axis of the first pin roll 141 and the vertical plane including the rotation axis of the second pin roll 142, at any location on the upper edge 154*a* of the upper partition 154, at least one of the following fifth condition and sixth condition may be satisfied.

Fifth condition: the distance from the circumferential surface of the cutter roll 131 does not exceed 3 cm and preferably does not exceed 2 cm and more preferably does not exceed 1 cm.

Sixth condition: the distance from the circumferential surface of the receiving roll 132 does not exceed 3 cm and preferably does not exceed 2 cm and more preferably does not exceed 1 cm.

When arranging the upper partition 154, the position of the upper end of the enclosure 152 may be higher than the upper ends of the first pin roll 141 and the second pin roll 142, and the upper partition 154 may be arranged inside the enclosure 152.

In a modification example, the lower partition 150 and the upper partition 154 may be connected to each other to form an integral-type partition.

Figure 15:
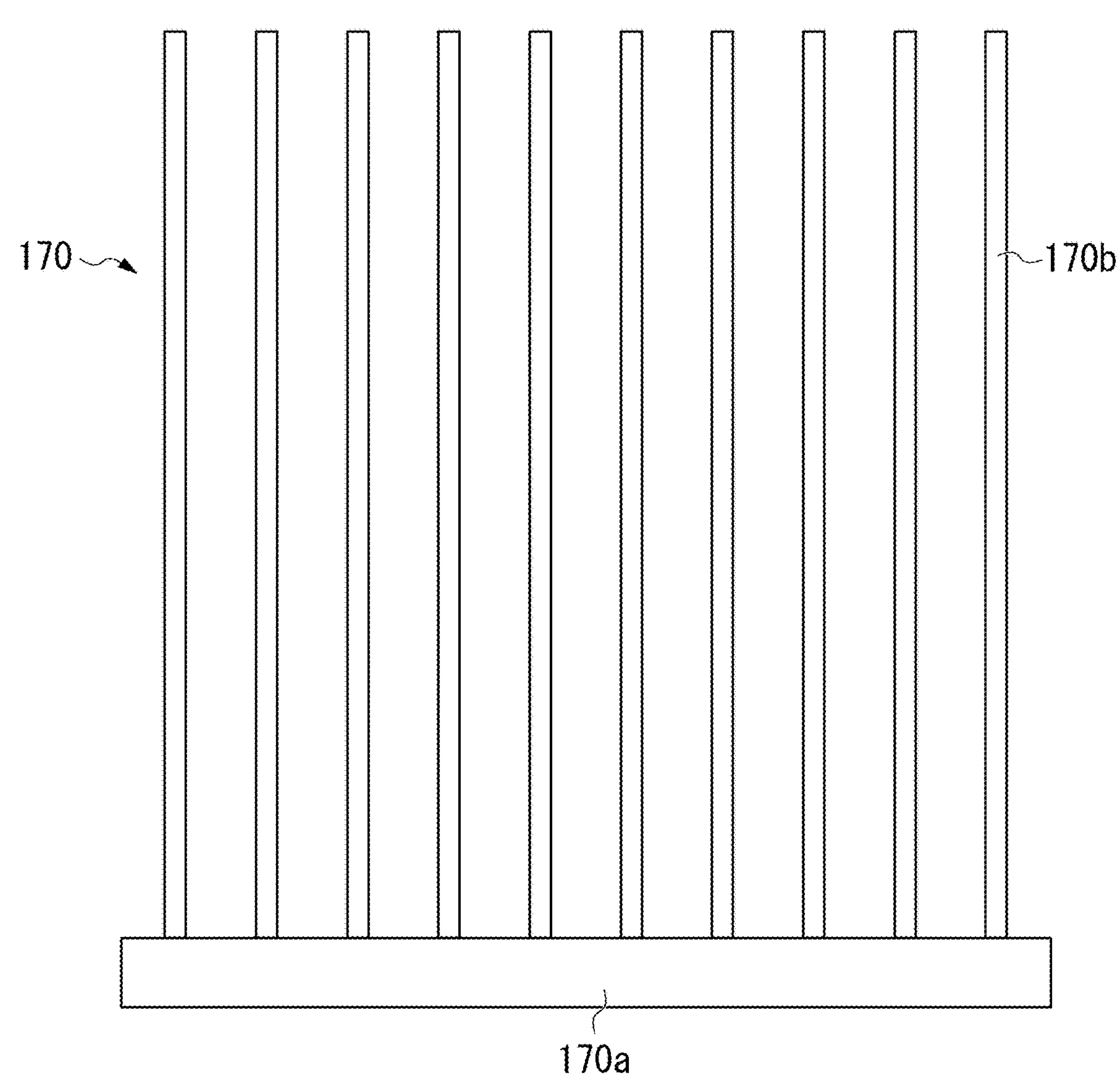
FIG. 15 is a schematic diagram of a comb.

In the example of FIG. 14, a comb 170 is arranged between the lower partition 150 and the first carrier film 41. As shown in FIG. 15, the comb 170 has a structure in which a plurality of second rods 170*b* are fixed to the sides of a first rod 170*a* like the teeth of a comb.

As shown in FIG. 14, the comb 170 is arranged such that the first rod 170*a* is parallel to the T direction and the second rods 170*b* are perpendicular to the T direction and preferably inclined such that the free ends of the second rods 170*b* are closer to the first carrier film 41 than the fixed ends. In the example of FIG. 14, the fixed ends of the second rods 170*b* are positioned further to the upstream side of the first carrier film 41 in the travel direction than the free ends, or may be positioned opposite thereto.

Using the comb 170 makes it possible to suppress the orientation of the chopped carbon fiber bundles deposited on the first carrier film 41 from being biased in the travel direction of the first carrier film 41. However, the use of the comb 170 is optional and not required.

Below the fragmentation-processing apparatus 140, the travel direction of the first carrier film 41 is preferably horizontal. In other words, the upper surface of the first carrier film 41 is preferably maintained to be horizontal below the fragmentation-processing apparatus 140.

Referring again to FIG. 3, the SMC manufacturing apparatus 100 has a mechanism for gradually bringing the first carrier film 41 and the second carrier film 42 closer together on the upstream side of the impregnating machine 160.

By this mechanism, the first carrier film 41 and the second carrier film 42 are laminated together to form a laminate 60. In the laminate 60, the first resin paste layer 51L, the carbon fiber mat 30, and the second resin paste layer 52L are sandwiched between the first carrier film 41 and the second carrier film 42. In order to transport this laminate 60 while sandwiched between two transport belts from above and below, the impregnating machine 160 is provided with two (upper and lower) belt transport devices, as well as rolls for pressing the laminate 60 sandwiched between each of the transport belts.

1.3. Manufacturing Method

A description will be given below of the method of manufacturing an SMC of the present embodiment using the SMC manufacturing apparatus described in 1.2. above as an example.

First, the continuous carbon fiber bundle 10 is drawn out from a fiber package prepared in advance. The continuous carbon fiber bundle may be drawn out by external unwinding from a bobbin package attached to a creel, or the continuous carbon fiber bundle may be drawn out by internal unwinding from a package from which the bobbin has been removed.

A plurality of the continuous carbon fiber bundles 10 are arranged to be parallel to each other and supplied to the chopper 130 from a direction perpendicular to the T direction. At this time, the continuous carbon fiber bundles 10 are arranged such that the number of those to be cut per axial direction length of the cutter roll 131 is constant.

Arranging the continuous carbon fiber bundles 10 at a constant pitch is preferable, but not required. For example, when a plurality of the lower partitions 150 are lined up at a constant pitch P in the T direction, the continuous carbon fiber bundles may be arranged such that the number of those to be cut per unit length of the cutter roll 131 is constant when the pitch P is the unit length.

In the chopper 130, the continuous carbon fiber bundle 10 is cut such that the fiber length after cutting is a predetermined length in the range of 10 mm to 60 mm to obtain the chopped carbon fiber bundles 20. The predetermined length may typically be inches (approximately 1.3 cm), 1 inch (approximately 2.5 cm), 2 inches (approximately 5.1 cm), or the like, without being limited thereto.

The objective of the fragmentation-processing by the fragmentation-processing apparatus 140 is not to unwind the chopped carbon fiber bundle 20 until it is a single filament or a state close thereto. Preferably, the circumferential speeds at the pin tips of the first pin roll 141 and second pin roll 142 are set such that the fragmentation-processing does not generate fiber bundles having a filament number of 0.5 K or less and single filaments, or such that even if they are generated, their amount contained in the carbon fiber mat 30 deposited on the first carrier film 41 is less than 1% by weight.

For example, when a continuous carbon fiber bundle having a filament number per bundle of NK and being partially split into n sub-bundles in advance is cut using a chopper, the chopped carbon fiber bundles produced thereby may include a fiber bundle having a filament number greater than $\{(N/n)+0.5\}$K for some reason. The objective of the fragmentation-processing may be to split such a chopped carbon fiber bundle into a plurality of chopped carbon fiber bundles having a filament number per bundle of less than $\{(N/n)+0.5\}$K.

In another example, the objective of the fragmentation-processing may be to split a chopped carbon fiber bundle obtained by cutting a continuous carbon fiber bundle without being partially split into chopped carbon fiber bundles having a lower filament number.

In the fragmentation-processing apparatus 140, the first pin roll 141 and the second pin roll 142 are driven to rotate such that the pins move downward from above on the side facing the other side, respectively. One of the reasons that the fragmentation-processing apparatus 140 has two pin rolls and that the two pin rolls are rotated in this manner is so that it is possible to strike more of the chopped carbon fiber bundle 20 with the pins of the pin rolls and, in addition, even when the weight of the chopped carbon fiber bundles is distributed, it is difficult for the carbon fiber mat 30 to have a front and back.

The reason why it is difficult for the carbon fiber mat 30 to have a front and back is that both heavy chopped carbon fiber bundles and light chopped carbon fiber bundles are collected in a narrow region between the two pin rolls and fall on the first carrier film 41 at the same time.

Another reason for rotating each of the first pin roll 141 and the second pin roll 142 such that the pins move downward from above on the side facing the other pin roll is not to apply a strong shear force to the chopped carbon fiber bundle 20 passing between these two pin rolls. This is because a strong shear force may cause fuzz in the carbon fiber bundles.

To achieve this objective more effectively, the circumferential speed at the pin tips is preferably equal between the first pin roll 141 and the second pin roll 142. Before depositing the carbon fiber mat 30, the first resin paste 51 is applied to the first carrier film 41 drawn out from the rolls, using the first applicator 110.

The first resin paste 51 is a thermosetting resin composition and the base resin thereof is, for example, a vinyl ester resin (also called epoxy acrylate resin), an unsaturated polyester resin, an epoxy resin, a polyimide resin, a maleimide resin, or a phenol resin, without being limited thereto. A mixed resin of a vinyl ester resin and an unsaturated polyester resin may be used as the base resin. The first resin paste 51 comprises curing agents, polymerization inhibitors, thickeners, reactive diluents, low shrinkage agents, and the like, blended therein as necessary.

The chopped carbon fiber bundles 20 processed with the fragmentation-processing apparatus 140 falls on the upper surface of the first carrier film 41 on which the first resin paste layer 51L is formed and forms the carbon fiber mat 30.

In a separate step, the second resin paste 52 having the same formulation as the first resin paste 51 is applied to the second carrier film 42 using the second applicator 120.

The second carrier film 42 is overlaid on the first carrier film 41 with the carbon fiber mat 30 placed on the upper surface with the surface on which the second resin paste layer 52L formed being face down and the laminate 60 formed thereby is pressed in the impregnating machine 160, such that the carbon fiber mat 30 is impregnated with the first resin paste 51 and the second resin paste 52.

The impregnated carbon fiber mat 30 is wound on a bobbin while still sandwiched between the first carrier film 41 and the second carrier film 42. Thereafter, the sheet molding compound is completed through a step of thickening the first resin paste 51 and the second resin paste 52 impregnated in the carbon fiber mat 30.

The sheet molding compound is used for molding CFRP products, for example, using the compression molding method. CFRP products able to be manufactured using the sheet molding compound include not only parts used for aircraft, unmanned aerial vehicles, automobiles, ships, and various other transportation equipment, but also encompass sporting goods, leisure goods, and the like.

2. Modified Embodiments

In modified embodiments, a modification in which the fragmentation-processing apparatus A is replaced with another type of fragmentation-processing apparatus or a modification in which the operation of the fragmentation-processing apparatus A is changed may be added with respect to the method of manufacturing an SMC and manufacturing apparatus described in 1. above.

In structures common to the method of manufacturing an SMC and manufacturing apparatus according to the modified embodiment and the method of manufacturing an SMC and manufacturing apparatus described in 1. above, the preferable embodiments thereof are also common.

2.1. First Modified Embodiment

In the first modified embodiment, the fragmentation-processing apparatus A is replaced with a single pin roll-type fragmentation-processing apparatus provided with only one pin roll having a rotation axis parallel to the T direction. The single pin roll provided in this fragmentation-processing apparatus may have a maximum radius, for example, in a range of 100 mm or more and 200 mm or less and a cylinder diameter in a range of 40 mm or more and 60 mm or less, without being limited thereto.

In the first modified embodiment, the "first vertical plane" and the "second vertical plane" are defined as follows: a vertical plane including the rotation axis of the pin roll is positioned intermediately between the first vertical plane and second vertical plane and distances from the vertical plane including the rotation axis of the pin roll to the first vertical plane and to the second vertical plane are both twice the maximum radius of the pin roll.

Among the chopped carbon fiber bundles supplied to the single pin roll-type fragmentation-processing apparatus, some fall directly under the pin roll, some bounce in the same direction as the travel direction of the first carrier film and some bounce in the opposite direction. Accordingly, in the first modified embodiment, the lower partition partitioning the space through which the fragmentation-processed chopped carbon fiber bundles fall preferably has a part sandwiched between the first vertical plane and the second vertical plane.

Whether the lower partition is provided to intersect one or both of the first vertical plane and the second vertical plane and whether the lower partition is continuous between the first vertical plane and the second vertical plane may be determined after observing where the chopped carbon fiber bundles fall most.

In the first modified embodiment, in order to make it difficult for the chopped carbon fiber bundles to orient along the lower partition, it is possible to corrugate at least a part of the lower partition such that the horizontal cross-section has a wave shape. The waveform may be a rectangular wave, a sine wave, a triangular wave, or a trapezoidal wave, without being limited thereto.

Also in the first modified embodiment, it is desirable for a part that travels directly under the lower partition from beginning to end when passing under the fragmentation-processing apparatus to not be produced on the first carrier film. Therefore, at least in a part of the lower partition, the normal line of the lower partition may be inclined from the T direction in the horizontal plane. The inclination angle may be 1° or more, 5° or more, 10° or more, 15° or more, or 20° or more, as well as 45° or less, 40° or less, or 35° or less, without being limited thereto.

In one example, it is possible to determine the inclination angle θ when the normal line of the lower partition is inclined from the T direction in the horizontal plane such that Expression (2) is satisfied.

$$D_{12} \cdot \tan\theta \geq a \cdot L_F \quad (2)$$

In Expression (2), $D_{12}$ is the distance between the first vertical plane and the second vertical plane (four times the maximum radius of the pin roll) and $L_F$ is the fiber length of the chopped carbon fiber bundle.

The coefficient a is preferably 1 and more preferably 2.

Instead of inclining the normal line of the lower partition from the T direction in the horizontal plane, at least a part of the lower partition may be corrugated such that the horizontal cross-section has a wave shape. The waveform of the corrugation may be a rectangular wave, preferably a trapezoidal wave, more preferably a sine wave, and most preferably a triangular wave. The period of the corrugation is preferably twice or more a fiber length of the chopped carbon fiber bundle.

2.2. Second Modified Embodiment

In the second modified embodiment, the fragmentation-processing apparatus A is replaced with a cage roll-type fragmentation-processing apparatus. The cage roll type fragmentation-processing apparatus is provided with a cage roll having a rotation axis parallel to the T direction as a means for striking the chopped carbon fiber bundle.

The cage roll is a roll having the central axis of the central rod as the rotation axis and which is provided with a structure in which a plurality of elongated members span between a pair of disks fixed around a central rod, as the unit structure thereof. Examples of elongated members include rods having various cross-sectional shapes, such as round rods, square rods, or flat rods, and taut wires.

In one example, a cage roll may have a plurality of the unit structures described above around a single central rod, or may have a disk which is common between two unit structures.

Figure 26:
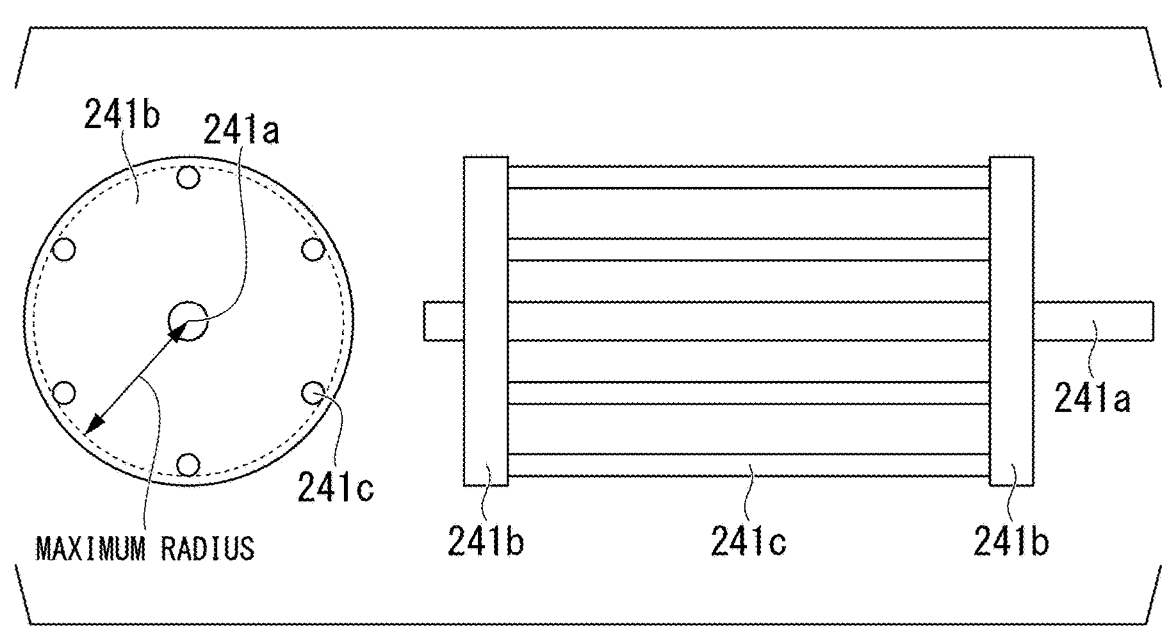
FIG. 26 is a schematic diagram showing a cage roll.

The cage roll 241 illustrated in FIG. 26 comprises a central rod 241*a*, a pair of disks 241*b* fixed at the periphery thereof, and six round rods 241*c* spanning between the pair of disks. In this example, all the round rods are arranged on one cylindrical surface centered around the rotation axis, but in other examples, a plurality of round rods (or other elongated members) may be arranged on each of a plurality of concentric cylindrical surfaces centered around the rotation axis. The number of round rods (or other elongated members) arranged on each cylindrical surface is not limited to six.

The diameter of the elongated members may be, for example, 3 mm or less, 1.5 mm or less, as well as 1 mm or more.

Here, the maximum radius of the cage roll is defined as the radius of the cylinder that is in contact with the elongated member farthest from the rotation axis from the opposite side of the rotation axis, among the cylinders centered around the rotation axis. In the case of the cage roll 241 shown in FIG. 26, the dashed line radius shown in the left diagram in FIG. 26 is the maximum radius.

The maximum radius of the cage roll may be, for example, in a range of 100 mm or more and 200 mm or less, without being limited thereto.

In the second modified embodiment, the "third vertical plane" and the "fourth vertical plane" are defined as follows: a vertical plane including the rotation axis of the cage roll is positioned intermediately between the third vertical plane and the fourth vertical plane and distances from the vertical plane including the rotation axis of the cage roll to the third vertical plane and to the fourth vertical plane are both twice the maximum radius of the cage roll.

Among the chopped carbon fiber bundles supplied to the cage roll type fragmentation-processing apparatus, some drop directly under the cage roll, some are bounced in the same direction as the travel direction of the first carrier film and some are bounced in the opposite direction. Accordingly, in the second modified embodiment, the lower partition arranged in the space through which the fragmentation-processed chopped carbon fiber bundles fall preferably has a part sandwiched between the third vertical plane and the fourth vertical plane.

Whether the lower partition is provided to intersect one or both of the third vertical plane and the fourth vertical plane and whether the lower partition is continuous between the third vertical plane and the fourth vertical plane may be determined after observing where the chopped carbon fiber bundles fall most.

In the second modified embodiment, in order to make it difficult for the chopped carbon fiber bundles to orient along the lower partition, it is possible to corrugate at least a part of the lower partition such that the horizontal cross-section has a wave shape. The waveform may be a rectangular wave, a sine wave, a triangular wave, or a trapezoidal wave, without being limited thereto.

In the second modified embodiment, it is also desirable for a part that travels directly under the lower partition from beginning to end when passing under the fragmentation-processing apparatus to not be produced on the first carrier film. Therefore, at least in a part of the lower partition, the normal line of the lower partition may be inclined from the T direction in the horizontal plane. The inclination angle may be, for example, 1° or more, 5° or more, 10° or more, 15° or more, or 20° or more, as well as 45° or less, 40° or less, or 35° or less, without being limited thereto.

In one example, it is possible to determine the inclination angle θ when the normal line of the lower partition is inclined from the T direction in the horizontal plane such that Expression (3) is satisfied.

$$D_{34}\cdot\tan\theta \geq a\cdot L_F \quad (3)$$

In Expression (3), $D_{34}$ is the distance between the third vertical plane and the fourth vertical plane (four times the maximum radius of the cage roll), and $L_F$ is the fiber length of the chopped carbon fiber bundle.

The coefficient a is preferably 1 and more preferably 2.

Instead of inclining the normal line of the lower partition from the T direction in the horizontal plane, at least a part of the lower partition may be corrugated such that the horizontal cross-section has a wave shape. The waveform of the corrugation may be a rectangular wave, preferably a trapezoidal wave, more preferably a sine wave, and most preferably a triangular wave. The period of the corrugation is preferably twice or more a fiber length of the chopped carbon fiber bundle.

2.3. Others

The fragmentation-processing apparatuses of a different type from the fragmentation-processing apparatus A used in the modified embodiments are not limited to those described in 2.1. and 2.2. above. In one of the modified embodiments, the direction of rotation of the pin rolls in the fragmentation-processing apparatus A described above may be changed and at least one of the first pin roll 141 and the second pin roll 142 may be driven to rotate such that the pins move from bottom to top on the side facing the other pin roll.

3. Experiment Results

The results of experiments conducted by the present inventors and others are given below.

3.1. Experiment 1

A flat continuous carbon fiber bundle (TR50S15L manufactured by Mitsubishi Chemical Corporation) having a filament number of 15K, a width of 8 mm, and a thickness of 0.1 mm was partially split into five sub-bundles each having a width of approximately 1.6 mm by forming four slit rows having a slit length of 1,000 mm and an inter-slit gap length of 5 mm. The position of the inter-slit gaps in the fiber direction was the same for all slit rows.

A carbon fiber mat was produced from the partially split continuous carbon fiber bundles described above using an SMC manufacturing apparatus having a basic configuration in common with the SMC manufacturing apparatus shown in FIG. 3, except for not comprising a fragmentation-processing apparatus and a lower partition.

More precisely, the continuous carbon fiber bundle was cut into approximately 1 inch (25.4 mm) lengths by a chopper and the produced chopped carbon fiber bundles were allowed to fall onto a carrier film without being coated with a resin paste and traveling in the horizontal direction at a line speed of 5 m/min, to form the carbon fiber mat.

Figures 16, 17:
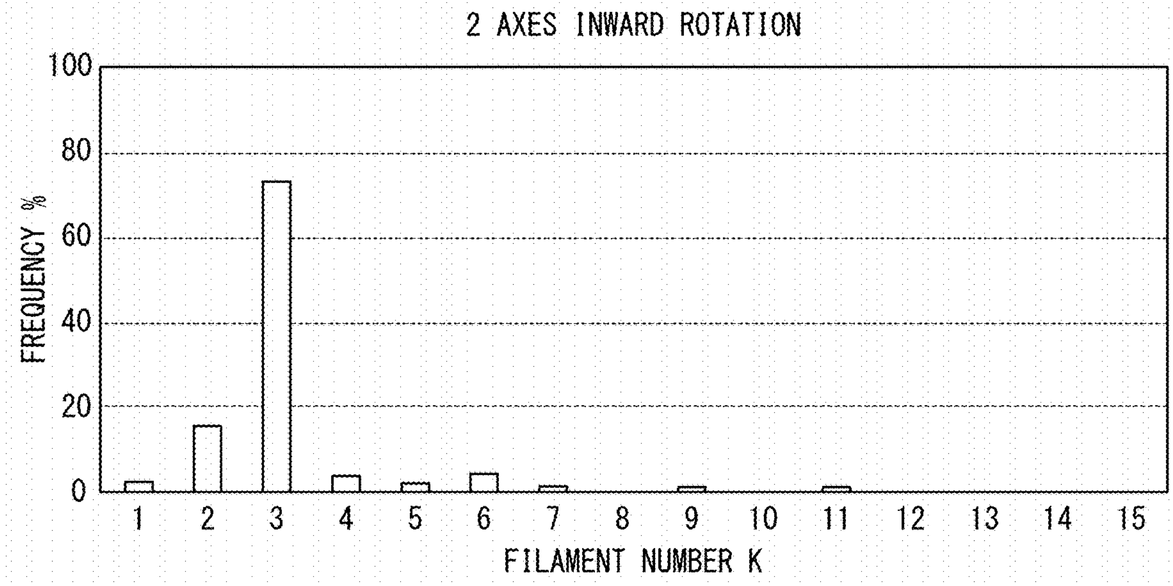
FIG. 16 is a histogram showing the filament number distribution of chopped carbon fiber bundles in a carbon fiber mat.
FIG. 17 is a histogram showing the filament number distribution of chopped carbon fiber bundles in a carbon fiber mat.

From the carbon fiber mat, a region of approximately $21\times30$ cm$^2$ deposited in the vicinity of the center line of the carrier film was selected and the weight of all the chopped carbon fiber bundles (300 or more pieces) included in the region was measured. The filament number distribution of the chopped carbon fiber bundles in the carbon fiber mat, as determined by converting the measured weight into a filament number, is shown in FIG. 16.

In the produced carbon fiber mat, the amount of carbon fiber bundles whose filament number exceeded 0.5 K was 99.9% by weight or more.

3.2. Experiment 2

A carbon fiber mat was produced using the same SMC manufacturing apparatus used in Experiment 1 except for comprising a fragmentation-processing apparatus. The filament number distribution of the chopped carbon fiber bundles in the carbon fiber mat was measured. The procedure for producing the carbon fiber mat was the same as in Experiment 1, except that the chopped carbon fiber bundles were fragmentation-processed with the fragmentation-processing apparatus before being deposited on a carrier film.

The fragmentation-processing apparatus comprised two pin rolls arranged side by side in the horizontal direction, each provided with a rotation axis parallel to the T direction. The two pin rolls were both made of metal and had the same configuration. The diameter and length of the pins arranged on the circumferential surfaces of the cylinders of the pin rolls were 3 mm and 20 mm, respectively. The arrangement of the pins on the circumferential surface of the cylinders of the pin rolls was periodic and overlapped with the original arrangement when shifted 7.5 mm in the axial direction and 6.5 mm in the circumferential direction in a plane development of the circumferential surface. The sum of the maximum radii of each pin roll was 10 mm greater than the distance between the rotation axes of the two pin rolls.

The carbon fiber mat was produced while rotating the two pin rolls both at a circumferential speed of 377 m/min at the pin tips such that in each of the two pin rolls, the pins moved downward from above on the side facing the other pin roll. The filament number distribution of the chopped carbon fiber bundles in the produced carbon fiber mat is shown in FIG. 17.

In the produced carbon fiber mat, the amount of carbon fiber bundles whose filament number exceeded 0.5 K was 99.9% by weight or more.

3.3. Experiment 3

A carbon fiber mat was produced in the same manner as in Experiment 2, except that the two pin rolls were each rotated such that the pins moved upward from below on the side facing the other pin roll. The filament number distribution in the carbon fiber mat was measured.

Figure 18:
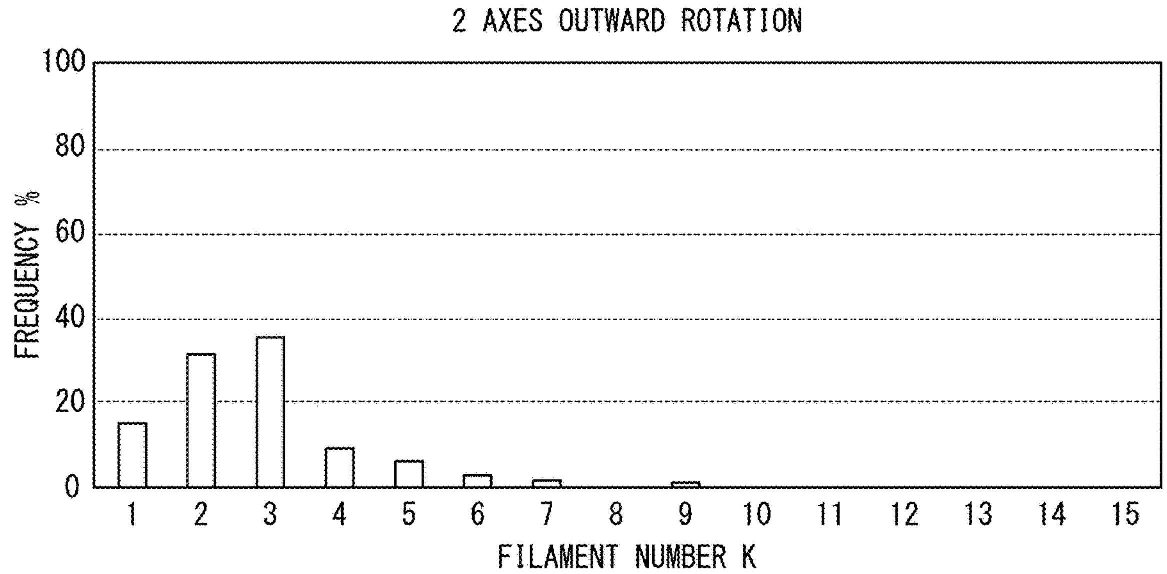
FIG. 18 is a histogram showing the filament number distribution of chopped carbon fiber bundles in a carbon fiber mat.

The filament number distribution of the chopped carbon fiber bundles in the produced carbon fiber mat is shown in FIG. 18.

It was found that the chopped carbon fiber bundles tended to be more finely fragmented in the fragmentation-processing of Experiment 3 compared to that of Experiment 2.

3.4. Experiment 4

A carbon fiber mat was produced in the same manner as in Experiment 2, except that the two pin rolls were rotated in the same direction. The filament number distribution in the carbon fiber mat was measured.

Figure 19:
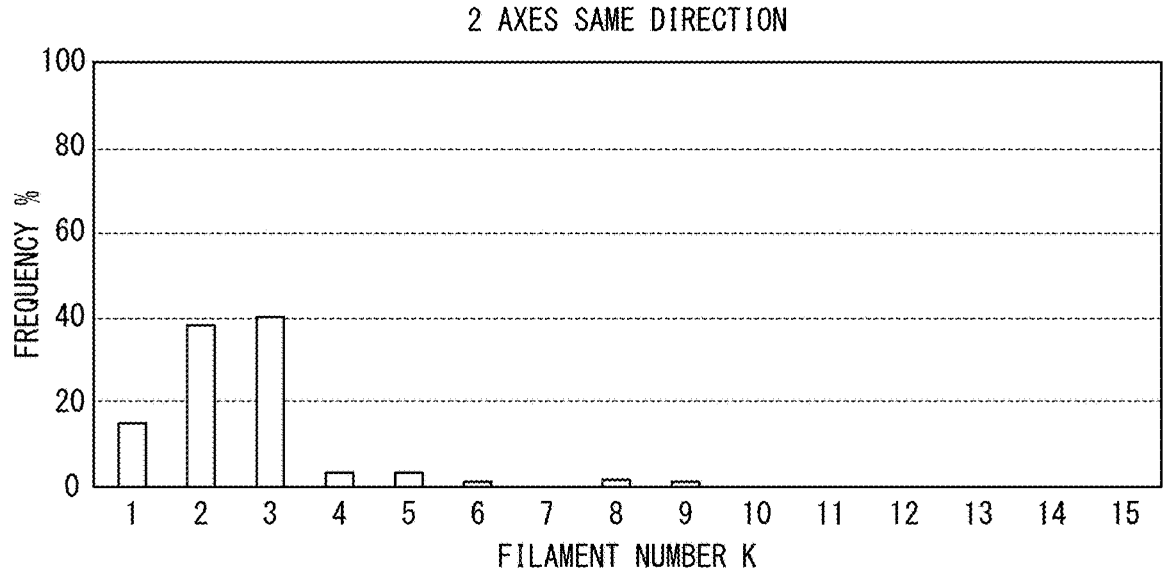
FIG. 19 is a histogram showing the filament number distribution of chopped carbon fiber bundles in a carbon fiber mat.

The filament number distribution of the chopped carbon fiber bundles in the produced carbon fiber mat is shown in FIG. 19.

It was found that the chopped carbon fiber bundles tended to be more finely fragmented in the fragmentation-processing of Experiment 4 compared to that of Experiment 2.

3.5. Experiment 5.

The experiment described below was performed using an SMC manufacturing apparatus having the same basic configuration as the SMC manufacturing apparatus shown in FIG. 3, except that a lower partition was not provided and two side covers were arranged to regulate the T direction width of the carbon fiber mat deposited on the carrier film.

A flat continuous carbon fiber bundle (TR50S15L manufactured by Mitsubishi Chemical Corporation) having a filament number of 15K, a width of 8 mm, and a thickness of 0.1 mm was partially split into 9 sub-bundles each having a width of approximately 0.9 mm by forming 8 slit rows having a slit length of 700 mm and an inter-slit gap length of 5 mm. The position of the inter-slit gaps in the fiber direction was the same for all slit rows.

Figure 20:
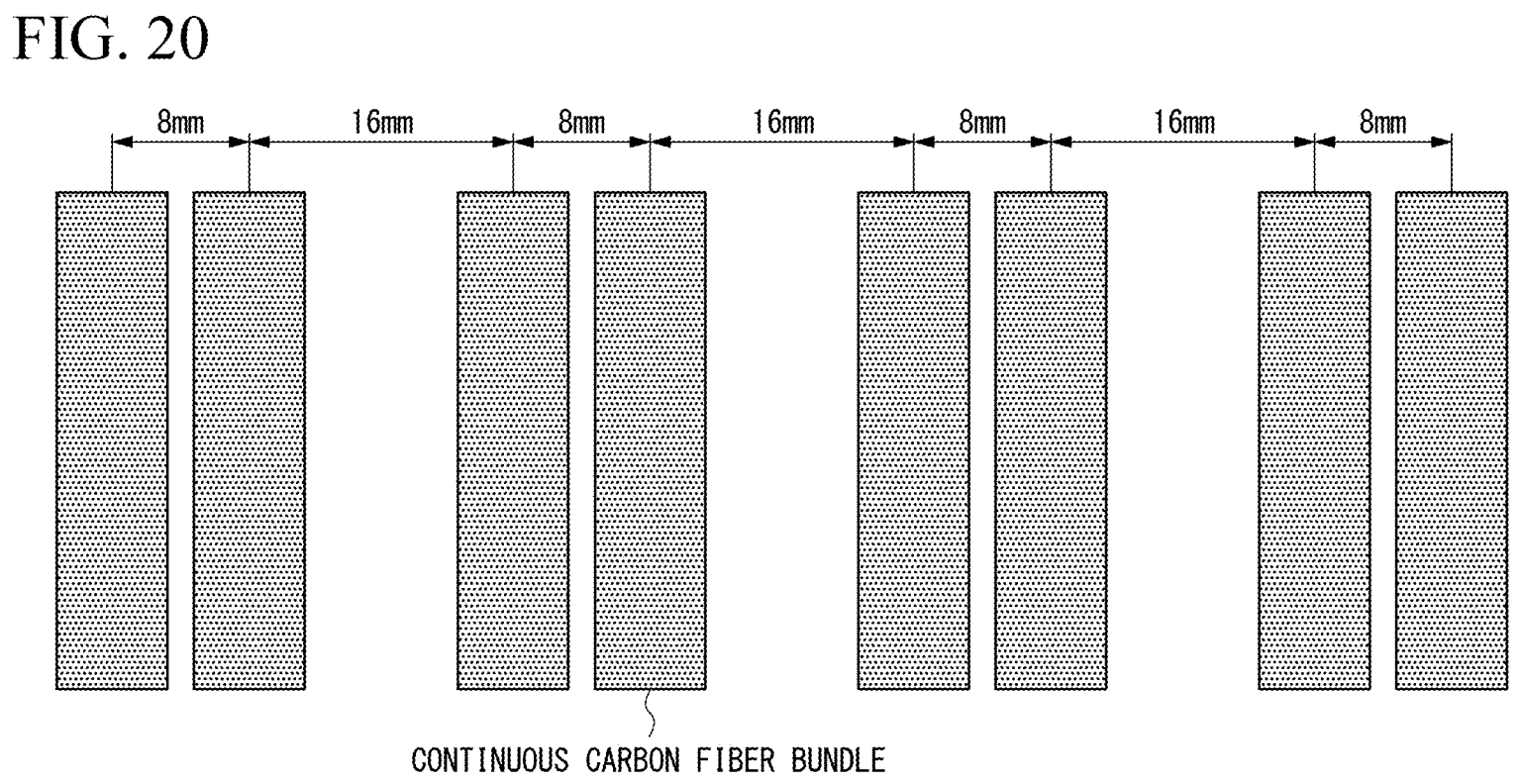

Fifty-two of the partially split continuous carbon fiber bundles were arranged to be parallel to each other and supplied to the chopper of the SMC manufacturing apparatus from a direction intersecting the T direction. The pitches between the continuous carbon fiber bundles when arranged in parallel for supplying to the chopper were alternately 8 mm and 16 mm, as shown in FIG. 20.

The continuous carbon fiber bundles were cut into approximately 1 inch (25.4 mm) lengths by the chopper. The produced chopped carbon fiber bundles were fragmentation-processed with a fragmentation-processing apparatus and then allowed to fall on a carrier film without being coated with a resin paste and traveling in the horizontal direction at a line speed of 5 m/min.

The fragmentation-processing apparatus was the same as that used in Experiments 2 to 4.

The two pin rolls were rotated both at a circumferential speed of 314 m/min at the pin tip such that in each of the two pin rolls, the pins moved downward from above on the side facing the other pin roll.

The two side covers arranged under the fragmentation-processing apparatus comprised aluminum alloy plates and were parallel to the travel direction of the carrier film. The two side covers had each a length in the travel direction of the carrier film of 200 mm. Both side covers were arranged to intersect both the vertical plane including the rotation axis of one pin roll of the fragmentation-processing apparatus and the vertical plane including the rotation axis of the other pin roll of the fragmentation-processing apparatus.

The lower edge of each side cover was horizontal and distant from the upper surface of the traveling carrier film by 58 mm. The lower part of each side cover was gently folded inward such that the interval in the T direction between the lower edges of the two side covers was 600 mm.

As a result of using the side covers, the T direction width of the carbon fiber mat deposited on the carrier film was approximately 600 mm.

Figure 21:
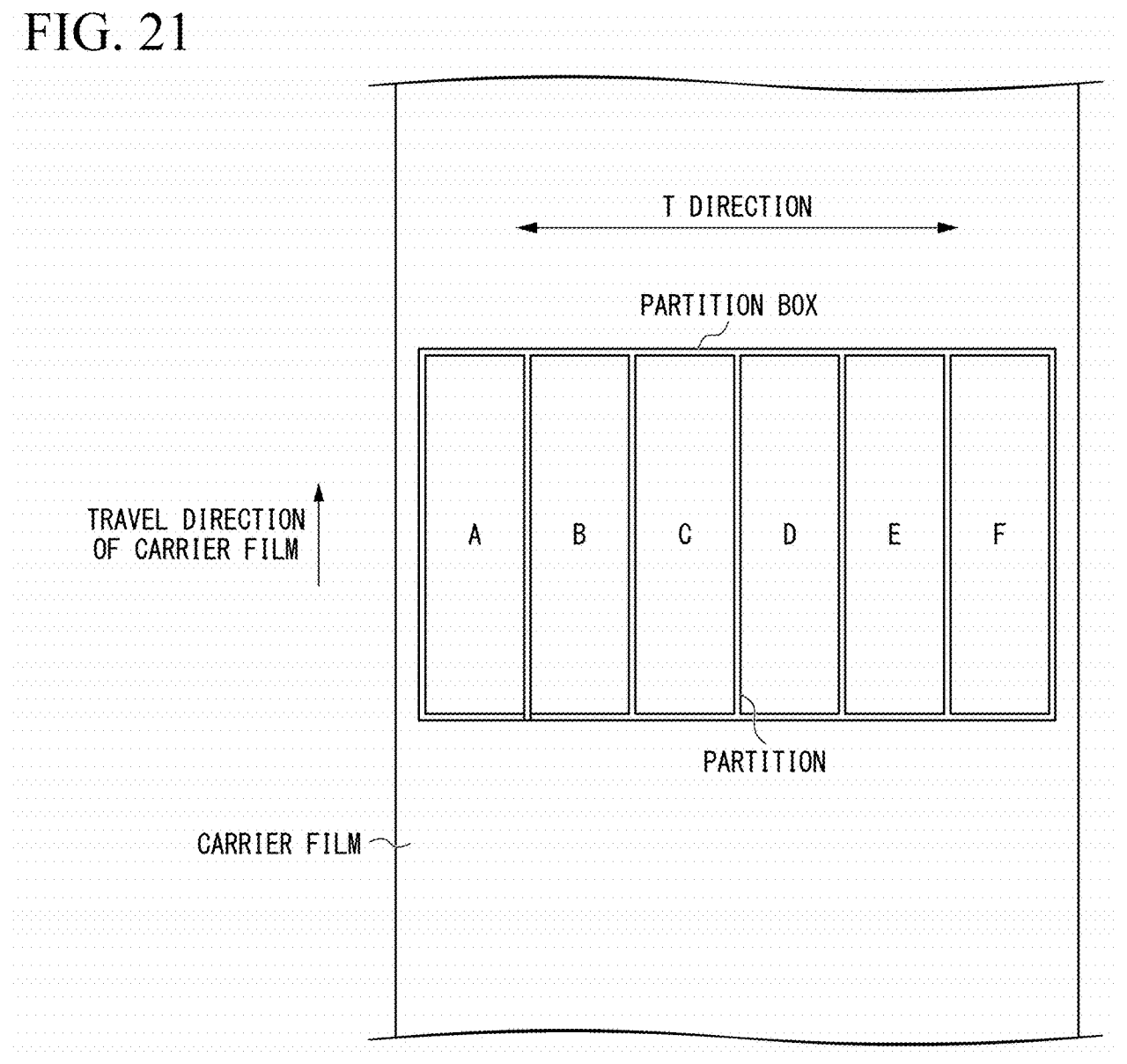
Figure 22:
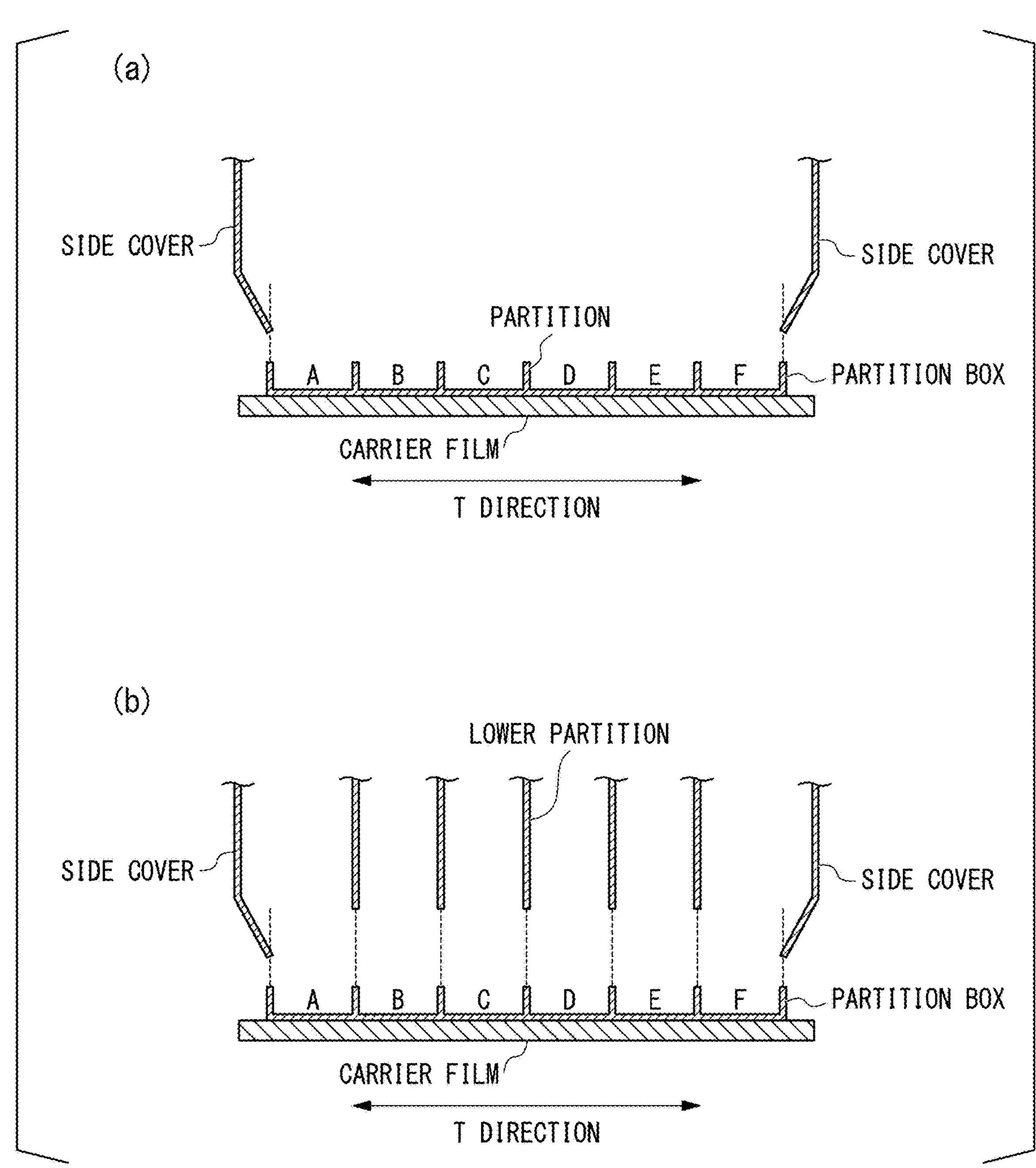
FIG. 22(*a*) shows the positional relationship between the partition box and side covers and FIG. 22(*b*) shows the positional relationship between the partition box, side covers, and lower partitions. In each of FIGS. 22(*a*) and 22(*b*), the travel direction of the carrier film is perpendicular to the paper surface.

In order to examine the distribution of areal weight of the carbon fiber mat in the T direction, a 600 mm (longitudinal direction)×300 mm (transverse direction)×45 mm (height) partition box was prepared in which six compartments A to F, each having a 100 mm×300 mm opening at the upper part were lined up in a row. The partition box was placed on the carrier film and passed under the fragmentation-processing apparatus such that the longitudinal direction was parallel to the T direction, as shown in FIG. 21, and such that both ends in the longitudinal direction each passed directly under the lower edge of the side cover, as shown in FIG. 22(*a*).

The weights of the chopped carbon fiber bundles fallen into each of the six compartments A to F of the partition box were measured and the mean, standard deviation, and coefficient of variation between the compartments were calculated.

3.6. Experiment 6

Five upper partitions having the same shape and size as each other and five lower partitions having the same shape and size as each other were produced with flat aluminum alloy plates having a thickness of 3 mm.

The five lower partitions were installed between two side covers placed under the fragmentation-processing apparatus at a pitch of 100 mm along the T direction, such that each was perpendicular to the T direction and one in the center was positioned exactly intermediately between the two side covers.

Five upper partitions were installed between the chopper and the fragmentation-processing apparatus such that each was perpendicular to the T direction and each was paired with one of the lower partitions.

Horizontal sections were provided at both ends of the upper edge of the lower partition and at both ends of the lower edge of the upper partition, such that between the paired lower partition and upper partition, the upper edge of the former and the lower edge of the latter butt up against each other at the horizontal sections.

Both the lower partition and the upper partition were provided with straight rear edges and front edges parallel to each other. The lower partition and upper partition were installed, such that the rear edge and front edge were vertical.

The lengths of the lower partition and the upper partition from the rear edge to the front edge, that is, the lengths in the travel direction of the carrier film, were both 370 mm. Both the lower partition and the upper partition were arranged to intersect both the vertical plane including the rotation axis of one pin roll of the fragmentation-processing apparatus and the vertical plane including the rotation axis of the other pin roll of the fragmentation-processing apparatus.

In a part where the upper edge of the upper partition faced the circumferential surface of the receiving roll of the chopper, the upper edge of the upper partition was made parallel to the circumferential surface of the receiving roll at a distance of 10 mm and, in a part where the upper edge of the upper partition faced the circumferential surface of the cutter roll of the chopper, the upper edge of the upper partition was made parallel to the circumferential surface of the cutter roll at a distance of 10 mm.

In a part where the lower edge of the upper partition faced the circumferential surface of one pin roll of the fragmentation-processing apparatus, the lower edge of the upper partition was made parallel to the circumferential surface of the one pin roll at a distance of 30 mm and, in the part where the lower edge of the upper partition faced the circumferential surface of the other pin roll of the fragmentation-processing apparatus, the lower edge of the upper partition was made parallel to the circumferential surface of the other pin roll at a distance of 30 mm.

In a part where the upper edge of the lower partition faced the circumferential surface of one pin roll of the fragmentation-processing apparatus, the upper edge of the lower partition was made parallel to the circumferential surface the one pin roll at a distance of 30 mm and, in a part where the upper edge of the lower partition faced the circumferential surface of the other pin roll of the fragmentation-processing apparatus, the upper edge of the lower partition was made parallel to the circumferential surface of the other pin roll at a distance of 30 mm.

The lower edge of the lower partition was horizontal and distant from the upper surface of the carrier film by 177 mm.

In the same manner as in Experiment 5, except that the five lower partitions and the five upper partitions was installed in the SMC manufacturing apparatus as described above, fifty-two of the partially split continuous carbon fiber bundles were supplied to the chopper to cut, and the produced chopped carbon fiber bundles were processed with a fragmentation-processing apparatus and then allowed to fall onto a traveling carrier film.

The partition box used in Experiment 5 was placed on the carrier film and passed under the fragmentation-processing apparatus such that each of the five partitions in the partition box passed directly under the lower partition provided in the SMC manufacturing apparatus, as shown in FIG. 22(*b*).

The weights of the chopped carbon fiber bundles fallen into each of the six compartments A to F of the partition box were measured and the mean, standard deviation, and coefficient of variation between the compartments were calculated.

3.7. Experiment 7

In the same manner as in Experiment 6, except that only the lower partitions were installed in the SMC manufacturing apparatus without installing the upper partition, fifty-two of the partially split continuous carbon fiber bundles were supplied to the chopper to cut, and the produced chopped carbon fiber bundles were processed with a fragmentation-processing apparatus and then allowed to fall onto a traveling carrier film.

In the same manner as in Experiment 6, a partition box was placed on the carrier film and passed under the fragmentation-processing apparatus, the weights of the chopped carbon fiber bundles fallen into each of the six compartments A to F of the partition box were measured, and the mean, standard deviation, and coefficient of variation between compartments were calculated.

3.8. Experiment 8

In the same manner as in Experiment 6, except that only the upper partitions were installed in the SMC manufacturing apparatus without installing the lower partition, fifty-two of the partially split continuous carbon fiber bundles were supplied to the chopper to cut, and the produced chopped carbon fiber bundles were processed with a fragmentation-processing apparatus and then allowed to fall onto a traveling carrier film.

In the same manner as in Experiment 6, a partition box was placed on the carrier film and passed under the fragmentation-processing apparatus, the weights of the chopped carbon fiber bundles fallen into each of the six compartments A to F of the partition box were measured, and the mean, standard deviation, and coefficient of variation between compartments were calculated.

The results of Experiments 5 to 8 above are summarized in Table 1 below.

TABLE 1

| | Weight of chopped carbon fiber bundle fallen in each compartment [g] | | | | | | Mean | Standard deviation | Coefficient of variation |
|---|---|---|---|---|---|---|---|---|---|
| | A | B | C | D | E | F | [g] | [g] | [%] |
| Experiment 5 | 29.0 | 42.9 | 35.8 | 35.2 | 44.4 | 31.2 | 36.4 | 5.6 | 15 |
| Experiment 6 | 34.6 | 38.1 | 35.2 | 36.7 | 37.2 | 36.0 | 36.3 | 1.2 | 3 |
| Experiment 7 | 37.4 | 37.9 | 32.1 | 33.0 | 37.8 | 38.8 | 36.2 | 2.6 | 7 |
| Experiment 8 | 28.2 | 44.5 | 34.4 | 36.6 | 43.9 | 31.8 | 36.6 | 6.0 | 16 |

Although the present invention was described above in accordance with specific embodiments, each embodiment is presented as an example and does not limit the scope of the present invention. It is possible for each embodiment described in the present specification to be variously modified in a range in which the effects of the invention are achieved and to be combined with features described by other embodiments to the extent practicable.

REFERENCE SIGNS LIST

10: Continuous carbon fiber bundle
11: Sub-bundle
20: Chopped carbon fiber bundle
30: Carbon fiber mat
41: First carrier film
42: Second carrier film
51: First resin paste
51L: First resin paste layer
52: Second resin paste
52L: Second resin paste layer
60: Laminate
100: SMC manufacturing apparatus
110: First applicator
120: Second applicator
130: Chopper
131: Cutter roll
132: Receiving roll (rubber roll)
133: Guide roll
140: Fragmentation-processing apparatus
141: First pin roll
142: Second pin roll
150: Lower partition
152: Enclosure
154: Upper partition
160: Impregnating machine
170: Comb

What is claimed is:

1. A carbon fiber mat deposition apparatus comprising:

a carrier film travel path;

a continuous carbon fiber bundle, the continuous carbon fiber bundle is arranged in X, Y and Z directions, wherein the Z direction is a thickness direction of the continuous carbon fiber bundle, a chopper arranged above the travel path to chop the continuous carbon fiber bundle;

a fragmentation-processing apparatus arranged between the chopper and the travel path, wherein the fragmentation processing apparatus splits the chopped carbon fiber bundles and deposit a carbon fiber mat on the carrier film; and a lower partition by which a space between the fragmentation-processing apparatus and the travel path is partitioned along a T direction, wherein, when a direction of the carrier film being horizontal and being perpendicular to the travel path is the T direction, the chopper comprises a cutter roll having a rotation axis parallel to the T direction, and, the lower partition comprises a flat plate and, in at least a part of the lower partition, a thickness direction of the flat plate is inclined from the T direction, a normal line of the lower partition being inclined from the T direction in a horizontal plane.

2. The carbon fiber mat deposition apparatus according to claim 1, wherein the normal line of the lower partition is inclined with an angle of the inclination is 1° or more and 45° or less.

3. The carbon fiber mat deposition apparatus according to claim 1, wherein the fragmentation-processing apparatus comprises a pin roll or a cage roll, and the pin roll or the cage roll has a rotation axis parallel to the T direction.

4. The carbon fiber mat deposition apparatus according to claim 1, wherein the fragmentation-processing apparatus has a first pin roll and a second pin roll, which are arranged side by side in a direction perpendicular to the T direction and have each a rotation axis parallel to the T direction, and the lower partition has a part sandwiched between a first vertical plane including the rotation axis of the first pin roll and a second vertical plane including the rotation axis of the second pin roll.

5. The carbon fiber mat deposition apparatus according to claim 1, wherein the fragmentation-processing apparatus comprise a cage roll having a rotation axis parallel to the T direction, the lower partition has at least a part sandwiched between a third vertical plane and a fourth vertical plane, and the third vertical plane and the fourth vertical plane are defined such that a vertical plane including the rotation axis of the cage roll is positioned intermediately between the third vertical plane and the fourth vertical plane, and distances from the vertical plane including the rotation axis of the cage roll to the third vertical plane and to the fourth vertical plane are both twice a maximum radius of the cage roll.

6. The carbon fiber mat deposition apparatus according to claim 1, wherein the lower partition includes a plurality of partitions which are lined up along the T direction.

7. The carbon fiber mat deposition apparatus according to claim 6, wherein all of the plurality of partitions are arranged inside an enclosure.

8. The carbon fiber mat deposition apparatus according to claim 7, wherein at least a part of the enclosure is corrugated such that a horizontal cross-section has a wave shape.

9. A sheet molding compound manufacturing apparatus comprising:

the carbon fiber mat deposition apparatus according to claim 1.

10. The sheet molding compound manufacturing apparatus according to claim 9, further comprising:

two applicators;

a mechanism for laminating two carrier films; and an impregnating machine.

11. A method of manufacturing a sheet molding compound that uses the sheet molding compound manufacturing apparatus according to claim 9.

12. A method of manufacturing a sheet molding compound using the carbon fiber mat deposition apparatus of claim 1, the method comprising:

drawing out a carrier film from a roll so that the carrier film travels while a width direction of the carrier film is maintained to be horizontal;

supplying a plurality of continuous carbon fiber bundles arranged in parallel to each other to a chopper comprising a cutter roll having a rotation axis parallel to a T direction that is a direction being horizontal and being perpendicular to a travel direction of the carrier film;

cutting the continuous carbon fiber bundles using the chopper to produce chopped carbon fiber bundles;

depositing a carbon fiber mat by allowing the chopped carbon fiber bundles to fall onto the carrier film, after fragmentation-processing the chopped carbon fiber bundles using a fragmentation-processing apparatus which is arranged below the chopper;

impregnating the carbon fiber mat with a thermosetting resin composition;

arranging a partition partitioning a space along the T direction, the space being that through which the fragmentation-processed chopped carbon fiber bundles fall, wherein, a normal line of the partition is inclined from the T direction in a horizontal plane.

13. The method of manufacturing according to claim 12, wherein an angle of the inclination is 1° or more and 45° or less.

14. The method of manufacturing according to claim 12, wherein the fragmentation-processing apparatus comprises a pin roll or a cage roll, and the pin roll or the cage roll has a rotation axis parallel to the T direction.

15. The method of manufacturing according to claim 12, wherein the fragmentation-processing apparatus has a first pin roll and a second pin roll, which are arranged side by side in a direction perpendicular to the T direction and have each a rotation axis parallel to the T direction, and the partition has a part sandwiched between a vertical plane including the rotation axis of the first pin roll and a vertical plane including the rotation axis of the second pin roll.

16. The method of manufacturing according to claim 12, wherein the fragmentation-processing apparatus comprises a cage roll having a rotation axis parallel to the T direction, the partition has a part sandwiched between a third vertical plane and a fourth vertical plane, and the third vertical plane and the fourth vertical plane are defined such that a vertical plane including the rotation axis of the cage roll is positioned intermediately between the third vertical plane and the fourth vertical plane, and distances from the vertical plane including the rotation axis of the cage roll to the third vertical plane and to the fourth vertical plane are both twice a maximum radius of the cage roll.

17. The method of manufacturing according to claim 12, wherein a plurality of the partitions are lined up along the T direction.

18. The method of manufacturing according to claim 17, wherein all of the partitions are arranged inside an enclosure.

19. The method of manufacturing according to claim 18, wherein at least a part of the enclosure is corrugated such that a horizontal cross-section has a wave shape.

20. The method of manufacturing according to claim 12, wherein, before depositing the carbon fiber mat on the carrier film, a resin paste comprising a thermosetting resin composition is applied to an upper surface of the carrier film, and after depositing the carbon fiber mat, another carrier film in which another resin paste comprising another thermosetting resin composition is applied to one surface is overlapped on an upper surface side of the carrier film to form a laminate, and the laminate is subjected to pressing.

21. The method of manufacturing according to claim 12, further comprising dropping the chopped carbon fiber bundles to pass through the partition such that the chopped carbon fiber bundles are spaced apart in the T-direction after falling through the partition.

* * * * *